United States Patent
Shi et al.

(10) Patent No.: US 11,705,973 B2
(45) Date of Patent: Jul. 18, 2023

(54) METHOD AND DEVICE FOR PROCESSING ULTRASONIC WAVES

(71) Applicant: BEIJING XIAOMI MOBILE SOFTWARE CO., LTD., Beijing (CN)

(72) Inventors: Runyu Shi, Beijing (CN); Naichao Guo, Beijing (CN); Song Mei, Beijing (CN); Yuqing Hua, Beijing (CN); Lin Zhang, Beijing (CN); Wei Lu, Beijing (CN); Kai Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 32 days.

(21) Appl. No.: 17/360,362

(22) Filed: Jun. 28, 2021

(65) Prior Publication Data
US 2022/0255636 A1 Aug. 11, 2022

(30) Foreign Application Priority Data
Feb. 10, 2021 (CN) .......................... 202110184833.8

(51) Int. Cl.
*H04B 11/00* (2006.01)
(52) U.S. Cl.
CPC ..................... *H04B 11/00* (2013.01)
(58) Field of Classification Search
CPC ................. H04B 11/00; H04B 10/00
See application file for complete search history.

(56) References Cited

U.S. PATENT DOCUMENTS

| 2004/0264713 | A1* | 12/2004 | Grzesek | G06F 3/16 381/101 |
| 2015/0244472 | A1* | 8/2015 | Poppe | H04B 11/00 367/135 |
| 2020/0169327 | A1* | 5/2020 | Lin | H04L 1/0045 |
| 2021/0344428 | A1* | 11/2021 | Jones | H04B 11/00 |

FOREIGN PATENT DOCUMENTS

| CN | 102509216 A | 6/2012 | |
| CN | 103806902 A | 5/2014 | |
| WO | 2019122910 A1 | 6/2019 | |
| WO | WO-2021007555 A1 * | 1/2021 | .............. H02J 50/15 |

OTHER PUBLICATIONS

Supplementary European Search Report in the European application No. 21182342.2, dated Dec. 17, 2021, (9 pages).
https://www.zhihu.com/question/20946901, Zhang Mingyun,"The sound wave that pays treasure pays (face to face pays) what principle is", From zhihu Aug. 14, 2014, (7 pages).

* cited by examiner

*Primary Examiner* — Isam A Alsomiri
*Assistant Examiner* — Joseph C Fritchman
(74) *Attorney, Agent, or Firm* — Arch & Lake LLP

(57) ABSTRACT

A frequency combination corresponding to target data to be transmitted is determined. The frequency combination includes at least two different frequencies. Ultrasonic waves of frequencies in the frequency combination are sent within a predetermined duration.

18 Claims, 17 Drawing Sheets

METHOD AND DEVICE FOR PROCESSING ULTRASONIC WAVES

CROSS-REFERENCE TO RELATED APPLICATIONS

This application claims the priority to Chinese Application No. 202110184833.8 filed on Feb. 10, 2021, the contents of which are incorporated herein by reference in their entirety for all purposes.

TECHNICAL FIELD

The present disclosure relates, but is not limited, to the field of communication, and more particularly, to a method and device for processing ultrasonic waves.

BACKGROUND

Sometimes, with the deepening of theoretical research and the development of science and technology, there are an increasing number of modes of communication between equipment, including Bluetooth, wireless network and other near field modes of communication. However, these modes of communication have high and specific requirements on hardware configuration, and the process of establishing the communication is cumbersome, resulting in high cost.

By contrast, data transmission based on ultrasonic waves is easy to implement, with transmitting/receiving equipment therefor capable of being freely located, and less interference on an ultrasonic frequency. In addition, an ultrasonic wave transmitting/receiving device such as a speaker, an earpiece, a microphone, etc., is already provided on terminal equipment (a mobile phone) commonly used, with no additional hardware cost. Thus, in many scenes of application, information coding or decoding, etc., may be implemented using ultrasonic waves.

However, at present, coding with an ultrasonic signal is characterized by a high bit error rate and poor interference immunity, thus quite user unfriendly.

SUMMARY

The present disclosure provides a method and device for processing ultrasonic waves, coding equipment, decoding equipment, and a storage medium.

According to an aspect of examples of the present disclosure, there is provided a method for processing ultrasonic waves, applied to coding equipment. The method includes:

determining a frequency combination corresponding to target data to be transmitted, the frequency combination comprising at least two different frequencies; and sending ultrasonic waves of frequencies in the frequency combination within a predetermined duration.

According to an aspect of examples of the present disclosure, there is provided a method for processing ultrasonic waves, applied to decoding equipment. The method includes:

receiving ultrasonic waves;

determining, in the ultrasonic waves, at least one frequency combination including frequencies, each of the at least one frequency combination including at least two different frequencies; and determining target data based on the at least one frequency combination.

According to an aspect of examples of the present disclosure, there is provided coding equipment including a processor and a memory.

The memory is configured to store processor-executable instructions.

The processor is configured to implement the method for processing ultrasonic wave applied to the coding equipment according to any example of the present disclosure when executing the executable instructions.

It should be understood that the general description above and the detailed description below are illustrative and explanatory, and do not limit the present disclosure.

BRIEF DESCRIPTION OF THE DRAWINGS

The accompanying drawings, which are incorporated in and form a part of this specification, examples consistent with the present disclosure and, together with the description, serve to explain the principles of the present disclosure.

DETAILED DESCRIPTION

Figure 1:
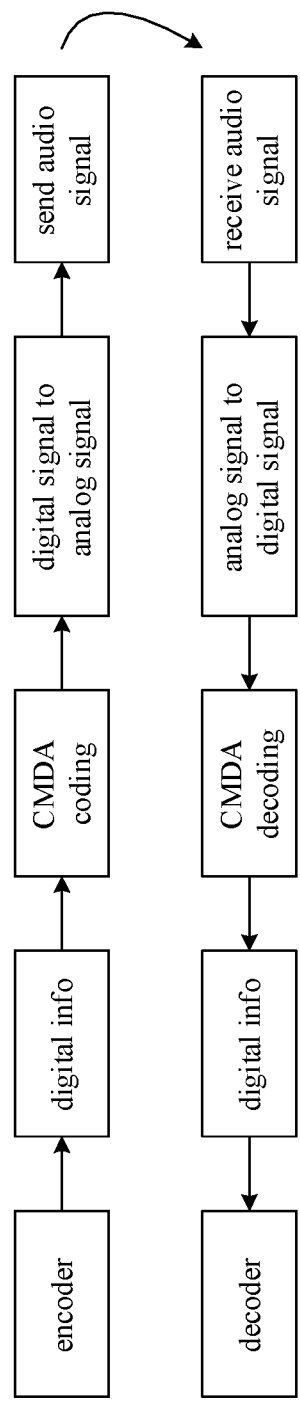
FIG. 1 is an illustrative diagram of a coding and decoding method based on CDMA coded ultrasonic waves according to an example.

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of devices and methods consistent with aspects related to the present disclosure as recited in the appended claims. The illustrative implementation modes may take on multiple forms, and should not be taken as being limited to examples illustrated herein. Instead, by providing such implementation modes, examples herein may become more comprehensive and complete, and comprehensive concept of the illustrative implementation modes may be delivered to those skilled in the art. Implementations set forth in the following examples do not represent all implementations in accordance with the present disclosure. Rather, they are merely examples of the apparatus and method in accordance with certain aspects.

Note that although a term such as first, second, third may be adopted in an example herein to describe various kinds of information, such information should not be limited to such a term. Such a term is merely for distinguishing information of the same type. For example, without departing from the scope of the examples herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of examples herein. However, those skilled in the art will know that the technical solutions of examples herein may be carried out without one or more of the details; alternatively, another method, component, device, option, etc., may be adopted. Under other conditions, no detail of a known structure, method, device, implementation, material or operation may be shown or described to avoid obscuring aspects of examples herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

A module of the device according to an aforementioned example herein may perform an operation in a mode elaborated in an aforementioned example of the method herein, which will not be repeated here.

Sometimes, some technical solutions based on ultrasonic wave coding or decoding are provided, as follows.

In a solution 1, as shown in FIG. 1, a coding and decoding method based on Code Division Multiple Access (CDMA) coded ultrasonic waves is provided. At an encoder side, CDMA coding is performed on digital information, acquiring coded information. The coded information of a digital signal is converted into an analog signal, acquiring an audio signal. The audio signal is output based on a loudspeaker. At a decoder side, the audio signal is received based on an earpiece. The audio signal of the analog signal is converted into a digital signal, acquiring the coded information. The coded information is decoded according to CMDA, acquiring the digital information.

Figure 2:
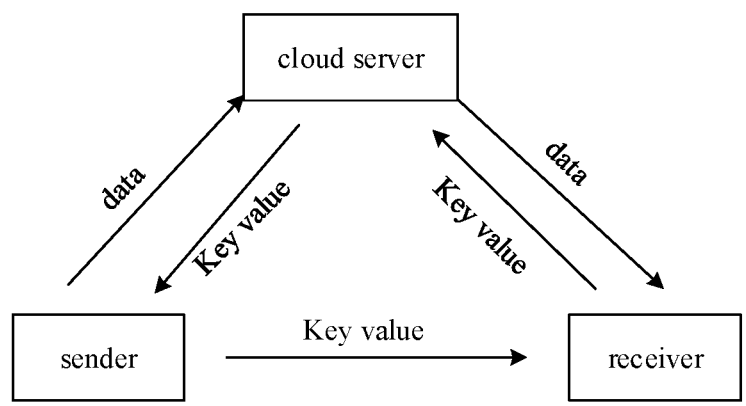
FIG. 2 is an illustrative diagram of a method for coding and decoding ultrasonic waves based on a cloud according to an example.

In a solution 2, as shown in FIG. 2, a method for coding and decoding ultrasonic waves based on a cloud is provided. At a sending end, data to be transmitted are sent to a cloud server before an audio signal is sent. The cloud server generates a Key value uniquely matching the file to be transmitted, and send the Key value to the sender. The sending end codes the Key value into ultrasonic waves and sends the ultrasonic waves. After receiving the ultrasonic waves, a receiving end acquires the Key value by decoding the ultrasonic waves, and acquires the data to be transmitted from the cloud server based on the Key value.

In a solution 3. a method and device for on-site payment using a mobile phone via an audio signal may be provided. The device includes a collecting client, a payment server, and a payment client. The collecting client is installed on a cashier terminal of a payee. The payment server is installed on a payment service terminal of a payment service, and the payment client is installed on a mobile phone held by a payer. The mobile phone of the payer is connected to the payment service through a network, and transmits data through asymmetric encryption. The cashier terminal of the payee is connected to the payment service through a network, and transmits data through asymmetric encryption. The cashier terminal of the payee sends an audio signal through a speaker. The audio signal is configured to deliver transaction information to the mobile phone of the payer. The audio signal is of a band of 16 KHZ-22 KHZ. The mobile phone of the payer receives the audio signal and performs processing.

In the solutions, the first solution requires coding with CMDA technology, and is therefore of complex coding and has a high bit error rate, as well as a great overhead for transmitting a small amount of data.

The receiving end of the second solution also needs to be in a receiving state consistently, leading to great power consumption. If manual intervention is needed, the operation is inconvenient and user unfriendly. Moreover, the coding of the second solution may generate pulse noise due to increase and decrease of ultrasound energy between two different codes. In order to reduce the noise, fade-in and fade-out may be added to each code, greatly increasing time outputting one code, resulting in a low bit rate.

With the solution 3, although an audio signal of a band of 16 KHZ-22 KHZ is employed, the hearing range for some people may be as high as 18 KHZ. The solution 3 is therefore not strictly of inaudible noise, and is very unfriendly to such people. Moreover, this solution may easily accumulate a great amount of intermodulation distortion components at a low-frequency portion, generating a low-frequency audible sound.

To address at least some of the problems, examples of the present disclosure provide a method for coding and decoding ultrasonic waves. Target data may be sent through a multi-frequency combination, lowering a bit error rate compared to transmission based on a single frequency, providing good interference immunity.

Figure 3:
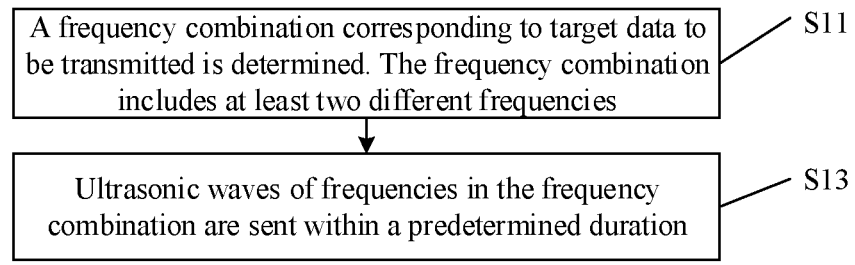
FIG. 3 is an illustrative diagram of a method for processing ultrasonic waves according to an example.

As shown in FIG. 3, there is provided a method for processing ultrasonic waves. The method includes steps as follows.

In S11 a frequency combination corresponding to target data to be transmitted is determined. The frequency combination includes at least two different frequencies.

In S13, ultrasonic waves of frequencies in the frequency combination are sent within a predetermined duration.

The method described in examples of the present disclosure may be applied to coding equipment. The coding equipment here may be a mobile phone, a computer, a server, sending equipment, a tablet computer, medical equipment, wearable equipment, etc. The coding equipment here may also be any equipment having an encoder. Alternatively, the coding equipment may be any equipment including a coding module or component, or capable of implementing a coding function, etc. The coding equipment here may also be any ultrasonic wave sending equipment.

The target data to be transmitted here may be information or an instruction to be transmitted, etc.

For example, the target data may be a word "start" or a string of characters "qidong".

As another example, the target data may be an English character "a" or a numeric character string "123", etc. The character "a" or the character string "123" may specify the meaning identified. For example, the character "a" may be configured to identify starting an application. For example, the character string "123" may be configured to identify establishment of a connection, etc.

The target data here may be of one or more pieces. One piece of the target data may correspond to one frequency combination.

For example, target data "0" may correspond to a frequency combination (f0-f1-f2). As another example, target data "01" may correspond to two frequency combinations (f0-f1-f2) and (f0-f1-f4), respectively.

At least one frequency may differ for different frequency combinations.

Figure 4:
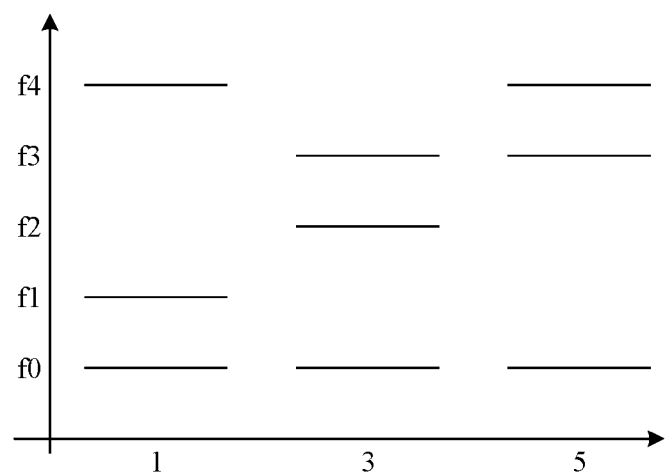
FIG. 4 is an illustrative diagram of different frequency combinations according to an example.

FIG. 4 provides an illustrative diagram of different frequency combinations. As shown in FIG. 4, three pieces of the target data "1", "3", and "5" may correspond respectively to frequency combinations (f0-f1-f4), (f0-f2-f3), and (f0-f3-f4).

In one example, S11 includes options as follows.

The target data to be transmitted may be converted into coded information in a base Z.

A frequency combination corresponding to the coded information may be determined.

The base Z may be one of a binary system, a quaternary system, an octal system, a decimal system, or a hexadecimal system. In other examples, the Z system may be another system, such as a base 32, etc.

For example, according to an ASCII code table, if converted into the decimal system, the character "a" may be data information "10". If converted into the octal system, the character "a" may be data information "141". If converted into the hexadecimal system, the character "a" may be data information "16", and so on.

In one example, a frequency combination corresponding to the coded information may be determined as follows.

A frequency combination corresponding to the coded information may be determined based on a correspondence between the coded information and the frequency combination.

Here, the correspondence between the coded information and the frequency combination may be preset. For example, a pre-set correspondence table representing the correspondence between respective coded information and frequency combinations may be stored in the coding equipment. Here, the correspondence may be any correspondence, so long as one frequency combination uniquely identifies one piece of coded information.

In one example, S13 may include an option as follows.

k frames of ultrasonic waves may be sent within a preset duration. One frame of ultrasonic waves may include each frequency of a frequency combination. The k may be an integer greater than 1.

In this way, in the present example, ultrasonic waves including frequencies of a frequency combination may keep being sent for a period of time. For example, when sending "a", a frequency combination of f0, f1, and f2 keeps being sent for a period of time.

In examples of the present disclosure, target data may be sent by being carried on multiple frequencies, lowering a bit error rate compared to sending the target data on a single frequency, providing good interference immunity. For example, when the target data are sent on a single frequency, wrong target data may be sent if an error occurs to the single frequency. If the target data are sent on multiple frequencies, the correct target data may be sent even if an error occurs to one of the frequencies.

In some examples, the method includes an option as follows.

M frequencies may be selected.

Any N frequencies of the M frequencies may be selected as a combination of frequencies. Both the M and the N may be integers greater than 1. The M may be greater than the N.

A correspondence between data to be transmitted and the combination of frequencies may be established.

The frequency combination corresponding to the target data to be transmitted may be determined as follows.

The frequency combination corresponding to the target data may be determined according to the correspondence.

In one example, the M frequencies are specific frequencies. For example, the specific frequencies are within a band from 19 KHZ to 23 KHZ. Thus, since the M frequencies are all ultrasonic frequencies, non-linear distortion caused by multi-frequency sound may be effectively reduced.

In examples of the present disclosure, there are M frequencies. N frequencies may be selected from the M frequencies. Then, there may be $C_M^N$ frequency combinations. Each frequency combination has N frequencies. For example, in a scene of application, if M=5, N=3, then there are $$C_5^3 = \frac{5 \times 4}{2} = 10$$

frequency combinations, each with three frequencies.

In examples of the present disclosure, the number M and the number N just have to meet that the M is greater than the N and $C_M^N$ is greater than the number of pieces of coded information corresponding to the target data.

For example, in a scene of application, the target data may be converted into a total number of 10 pieces of decimal coded information, i.e., 0, 1, 2, 3, 4, 5, 6, 7, 8, and 9, respectively. The 10 pieces of coded information may respectively correspond to different frequency combinations. As shown in Table 1 below, a correspondence between a frequency combination and coded information is provided.

TABLE 1

| Frequency combination | Coded information | |
|---|---|---|
| f0-f1-f2 | — | start bits |
| f0-f3-f4 | — | |
| f0-f1-f4 | 1 | data bits |
| f0-f1-f3 | 2 | |
| f0-f2-f3 | 3 | |
| f0-f2-f4 | 4 | |
| f0-f3-f4 | 5 | |
| f0-f2-f3 | 6 | |
| f0-f2-f4 | 7 | |
| f2-f3-f4 | — | check bit |
| f1-f3-f4 | — | end bit |

As shown in Table 1 above, the coded information corresponding to the target data may be "1234567". The coded information "1234567" is data bits. Coded information"1" corresponds to a frequency combination (f0-f1-f4). Coded information "2" corresponds to a frequency combination (f0-f1-f3). Coded information "3" corresponds to a frequency combination (f0-f2-f3). Coded information "4" corresponds to a frequency combination (f0-f2-f4). Coded information "5" corresponds to a frequency combination (f0-f3-f4). Coded information "6" corresponds to a frequency combination (f1-f2-f3). Coded information "7" corresponds to a frequency combination (f1-f2-f4). Start bits of two frequency combinations may be set. For example, the two frequency combinations of the start bits are (f0-f1-f2) and (f0-f3-f4), respectively. The two frequency combinations of the start bits may correspond to no coded information. A check bit of one frequency combination may be set. For example, the one frequency combination of the check bit is (f2-f3-f4). The one frequency combination of the check bit may correspond to no coded information. An end bit of one frequency combination may be set. For example, the one frequency combination of the end bit is (f1-f3-f4). The one frequency combination of the end bit may correspond to no coded information. Here, one frequency combination may be configured to represent one bit.

Here, coded information of different data bits may correspond to different frequency combinations. A frequency combination corresponding to coded information of a start bit here may be identical to or different from a frequency combination corresponding to coded information of any data bit. The frequency combination corresponding to coded information of the check bit here may be identical to or different from a frequency combination corresponding to coded information of any data bit. The frequency combination corresponding to coded information of the end bit here may be identical to or different from a frequency combination corresponding to coded information of any data bit.

In examples of the present disclosure, any M frequencies may be selected, and any N frequencies may be selected from the M frequencies as a frequency combination, so that the M frequencies may represent a total of $C_M^N$ frequency combinations, i.e., $C_M^N$ pieces of target data or coded information corresponding to the target data. Thus, $C_M^N$ correspondences each between a piece of target data and a frequency combination may be established. Alternatively, correspondence between coded information corresponding to the target data and a frequency combination may be established. Thus, a frequency combination corresponding to target data to be transmitted is determined accurately, and the target data to be transmitted may be sent by sending ultrasonic waves of frequencies in the frequency combination.

Furthermore, the M frequencies selected may be specific frequencies. For example, ultrasonic frequencies in a band from 19 KHZ to 23 KHZ, which are small ultrasonic frequencies, may be selected, so that the amplitude of a harmonic component generated is small, reducing nonlinear distortion of the ultrasonic waves, improving accuracy in sending the target data.

In one example, the target data are configured to implement at least one of:

starting an application of decoding equipment;

triggering display of an interface of the application by the decoding equipment;

triggering a payment operation by the decoding equipment based on the application;

triggering return of information by the decoding equipment; or triggering establishment of a connection with the coding equipment by the decoding equipment.

The decoding equipment here may be a mobile phone, a computer, a server, sending equipment, a tablet computer, medical equipment, wearable equipment, etc. The decoding equipment here may also be any equipment having a decoder. Alternatively, the decoding equipment may be any equipment including a decoding module or component, or capable of implementing a decoding function, etc.

The application may be Alipay, WeChat, Cloud Quick Pass, QQ, music, video, photography, etc. The interface may be an interface for payment, collection, song display, video playback, UC home page, etc. The application may be any application with a certain function. The interface may be any interface capable of displaying information or playing audio or video, etc. The application or the interface of the application is not limited herein.

For example, in a scene of application, the target data may be configured to start Alipay. When the decoding equipment receives the ultrasonic waves and identifies target data from the ultrasonic waves, an application of the decoding equipment such as Alipay may be started.

As another example, in a scene of application, the target data may be configured to trigger display of a payment code in Alipay. When the decoding equipment receives the ultrasonic waves and identifies the target data from the ultrasonic waves, the decoding equipment may be triggered to display the payment code in Alipay.

As another example, in a scene of application, the target data may be configured to trigger a payment operation based on WeChat. When the decoding equipment receives ultrasonic waves and identifies target data from the ultrasonic waves, the WeChat of the decoding equipment may be triggered to perform payment.

As another example, in a scene of application, the target data may be configured to trigger returning a key. When the decoding equipment receives ultrasonic waves and identifies target data from the ultrasonic waves, the decoding equipment may return a key such as a key to an electronic lock, etc. Thus, when the decoding equipment receives the ultrasonic waves indicating the target data sent by the coding equipment, the decoding equipment may return a key to the coding equipment for unlocking the lock by the coding equipment.

As another example, in a scene of application, the target data triggers establishing a connection with the coding equipment by the decoding equipment. For example, the target data may be a Bluetooth identifier. The decoding equipment may be Bluetooth equipment. The decoding equipment may be a cell phone capable of establishing a Bluetooth connection. The decoding equipment may send ultrasonic waves carrying a Bluetooth identifier. When the decoding equipment receives the ultrasonic waves and identifies the Bluetooth identifier from the ultrasonic waves, the decoding equipment may establish a connection with the coding equipment based on the Bluetooth identifier.

In other examples, the target data may also be a WIFI password or a password for various equipment or various applications, etc.

In examples of the present disclosure, frequency combinations corresponding to target data having various functions may be sent through ultrasonic waves, so that when receiving and decoding the ultrasonic waves and acquiring the target data, the decoding equipment may perform various functions corresponding to the target data, such as waking up a payment interface, making a payment, establishing a connection, etc. In this way, no manual operation by the user is needed, so that the decoding equipment may operate automatically based on the received ultrasonic waves, facilitating the user and saving operation time, improving user experience.

Figure 5:
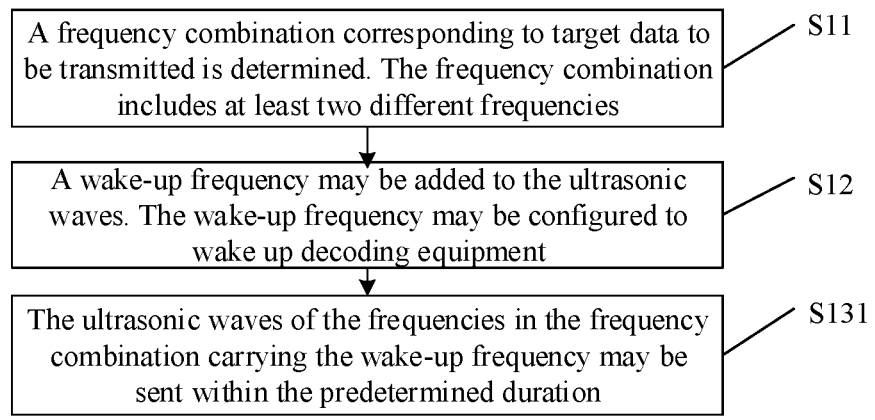
FIG. 5 is an illustrative diagram of a method for processing ultrasonic waves according to an example.

As shown in FIG. 5, in some examples, the method further includes a step as follows.

In S12, a wake-up frequency may be added to the ultrasonic waves. The wake-up frequency may be configured to wake up decoding equipment.

S13 may be implemented as follows.

In S131, the ultrasonic waves of the frequencies in the frequency combination carrying the wake-up frequency may be sent within the predetermined duration.

In one example, the wake-up frequency is less than each frequency in the frequency combination.

Figure 6:
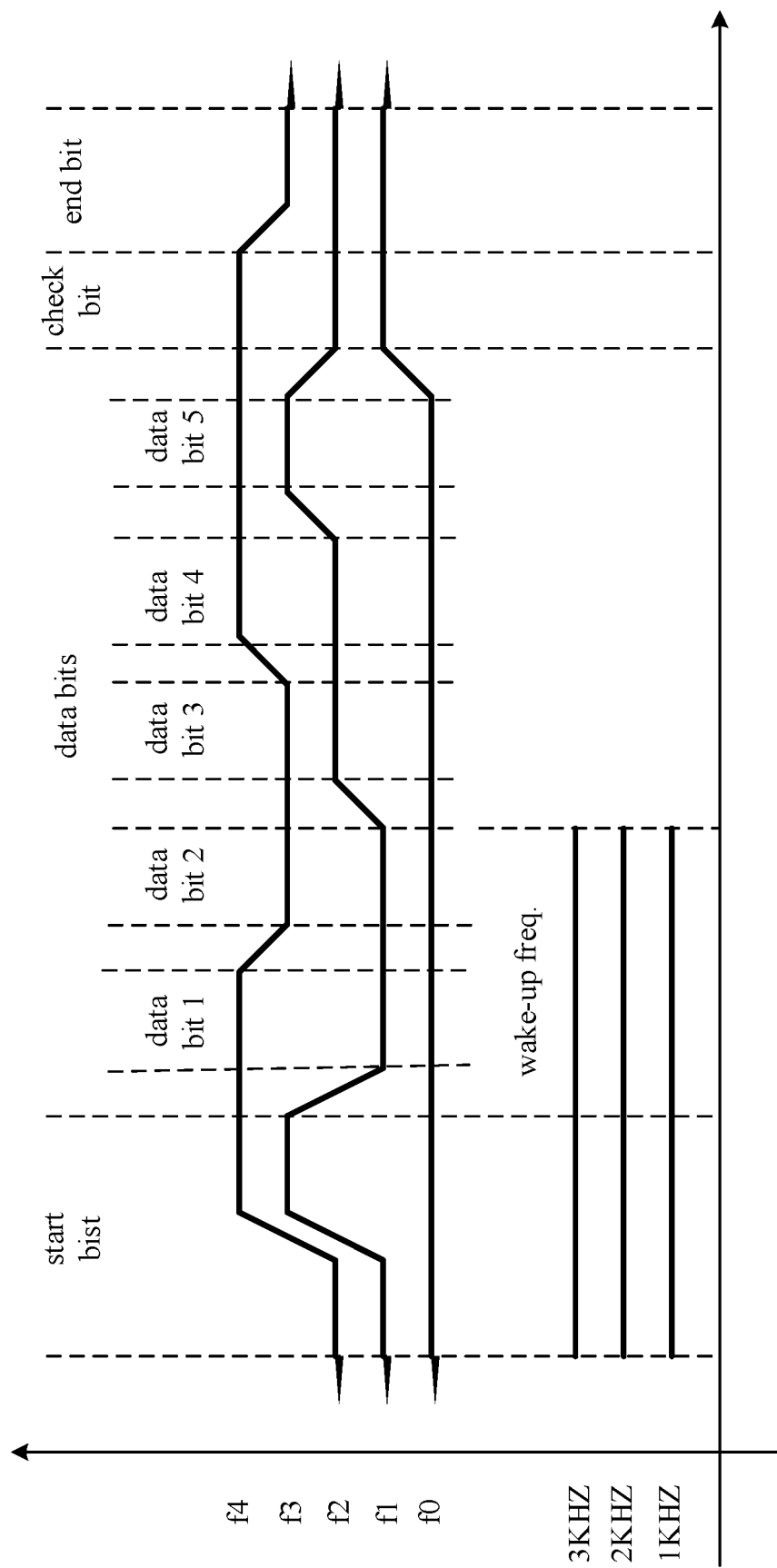
FIG. 6 is an illustrative diagram of a wake-up frequency according to an example.

For example, a frequency in the frequency combination is between 19 KHZ and 23 KHZ. The wake-up frequency may be 1 KHZ, 2 KHZ, or 3 KHZ, etc., as shown in FIG. 6.

In other examples, the wake-up frequency may just be different from a frequency in a frequency combination.

In examples of the present disclosure, by sending a wake-up frequency carried in the ultrasonic waves, a decoding component in the decoding equipment is waked up when the decoding equipment receives the ultrasonic waves and determines that the ultrasonic waves carry the wake-up frequency. The component having the decoding function in the decoding equipment may be a converter. For example, when determining that there is a wake-up frequency in the ultrasonic waves, the decoding equipment uses a high sampling rate such as FS=44100 Hz, FS=48000 Hz, FS=96000 Hz, etc. The FS is configured to represent the sampling rate. The analog signal of the ultrasonic waves may be converted into a digital signal, identifying the target data based on the digital signal of the ultrasonic waves. In this way, the signal collecting device or the decoder, etc. in the decoding equipment is not needed to remain in a working state of decoding or sampling at a high frequency, greatly reducing power consumption of the decoding equipment.

In a practical scene of application, a converter that converts an analog signal to a digital signal in decoding equipment generally has to use a high sampling rate, so that the converter is normally turned off, and turned on when a wake-up frequency is received. Moreover, since the converter requires use of a high sampling rate, it is possible to receive a frequency combination of high frequencies, and then perform decoding based on the frequency combination, acquiring target data.

In a practical application, if the wake-up frequency is identical to or not significantly different from a frequency in a frequency combination, the wake-up frequency and the frequency in the frequency combination may be confused with each other, failing to acquire accurate complete target data. By contrast, with examples of the present disclosure, the wake-up frequency is different from a frequency of a frequency combination, or a frequency in a frequency combination is greater than the wake-up frequency, thus greatly lowering occurrence of confusion between the wake-up frequency and a frequency in the combination on spectra, acquiring complete target data while waking the decoding equipment.

Figure 7:
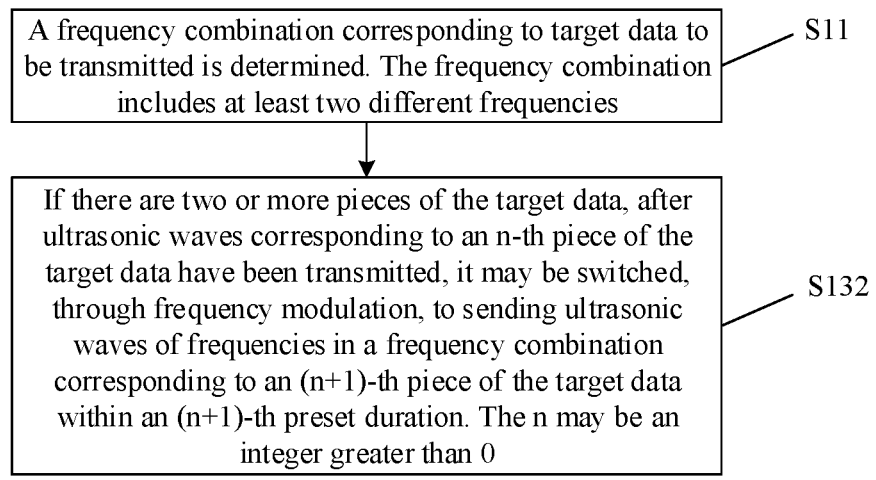
FIG. 7 is an illustrative diagram of a method for processing ultrasonic waves according to an example.

As shown in FIG. 7, in some examples, S13 includes a step as follows.

In S132, if there are two or more pieces of the target data, after ultrasonic waves corresponding to an n-th piece of the target data have been transmitted, it may be switched, through frequency modulation, to sending ultrasonic waves of frequencies in a frequency combination corresponding to an (n+1)-th piece of the target data within an (n+1)-th preset duration. The n may be an integer greater than 0.

In one example, the frequency modulation includes, but is not limited to, one of:

splicing frequency combinations corresponding to two successive pieces of the target data; or performing frequency shift on frequency combinations corresponding to two successive pieces of the target data, and performing splicing processing after the frequency shift.

For example, in a scene of application, frequency combinations (f0-f1-f2) and (f0-f3-f4) respectively corresponding to start bits, frequency combinations (f0-f1-f4), (f0-f1-f3), (f0-f2-f3), (f0-f2-f4), (f0-f3-f4), (f1-f2-f3), and (f1-f2-f4) respectively corresponding to data bits "1234567", a frequency combination (f2-f3-f4) corresponding to a check bit, and a frequency combination (f1-f3-f4) corresponding to an end bit, may have to be sent, such as in a mode as shown in Table 2. For example, the frequency combination (f0-f1-f2) may be sent within a first preset duration T1. The frequency combination (f0-f3-f4) may be sent within a second preset duration T2. The frequency combination (f0-f1-f4) may be sent within a third preset duration T3. The frequency combination (f0-f1-f3) may be sent within a fourth preset duration T4. The frequency combination (f0-f2-f3) may be sent within a fifth preset duration T5. The frequency combination (f0-f2-f4) may be sent within a sixth preset duration T6. The frequency combination (f0-f3-f4) may be sent within a seventh preset duration T7. The frequency combination (f1-f2-f3) may be sent within an eighth preset duration T8. The frequency combination (f1-f2-f4) may be sent within a ninth preset duration T9. The frequency combination (f2-f3-f4) may be sent within a tenth preset duration T10. The frequency combination (f1-f3-f4) may be sent within an eleventh preset duration T11.

TABLE 2

| duration | T1 | T2 | T3 | T4 | T5 | T6 | T7 | T8 | T9 | T10 | T11 |
|---|---|---|---|---|---|---|---|---|---|---|---|
| value | — | — | 1 | 2 | 3 | 4 | 5 | 6 | 7 | — | — |
| Ultrasonic freq. | f0-f1-f2 | f0-f3-f4 | f0-f1-f4 | f0-f1-f3 | f0-f2-f3 | f0-f2-f4 | f0-f3-f4 | f1-f2-f3 | f1-f2-f4 | f2-f3-f4 | f1-f3-f4 |
|  | start bits | | data bits | | | | | | | check bit | end bit |

Some frequency combinations (such as the start bits, the data bits "12345", the check bit, and the end bit)

corresponding to the ultrasonic waves in Table 2 above may be shown in FIG. 6.

In some examples, S13 may be implemented as follows.

If there are two or more pieces of the target data, two successive frequency combinations corresponding to two successive pieces of the target data may be acquired.

Ultrasonic waves of the two successive frequency combinations may be sent through frequency modulation based on frequencies of a same ordinal logic in the two successive frequency combinations.

In some examples, ultrasonic waves of the two successive frequency combinations may be sent through frequency modulation based on frequencies of a same ordinal logic in the two successive frequency combinations, as follows.

If the frequencies of the same ordinal logic in the two successive frequency combinations are identical, splicing processing may be performed on the frequencies of the same ordinal logic in the two successive frequency combinations.

The ultrasonic waves of frequencies of the two successive frequency combinations subject to splicing processing may be sent.

The two successive frequency combinations herein may be an ith frequency combination and an (n+1)-th frequency combination, where n is an integer greater than 0.

Two successive frequency combinations here may be an n-th frequency combination and an (n+1)-th frequency combination. The n may be an integer greater than 0.

Two successive frequency combinations here may be frequency combinations corresponding to two successive pieces of target data. Thus, in one implementation of S13, if the frequencies of the same ordinal logic in the frequency combinations corresponding to the two successive pieces of the target data are identical, splicing processing may be performed on the frequencies of the same ordinal logic in the frequency combinations corresponding to the two successive pieces of the target data. The ultrasonic waves of frequencies of the frequency combinations corresponding to the two successive pieces of the target data subject to splicing processing may be sent.

For example, as shown in FIG. 6, ultrasonic waves of frequency combinations (f0-f1-f2) and (f0-f3-f4) respectively corresponding to the start bits, frequency combinations (f0-f1-f4), (f0-f1-f3), (f0-f2-f3), (f0-f2-f4), and (f0-f3-f4) respectively corresponding to the data bits "12345", the frequency combination (f2-f3-f4) corresponding to the check bit, and the frequency combination (f1-f3-f4) corresponding to the end bit, may have to be sent. The data bit "1" may correspond to the frequency combination (f0-f1-f4). The data bit "2" may correspond to the frequency combination (f0-f1-f3). Then, the frequency combinations (f0-f1-f4) and (f0-f1-f3) may be two successive frequency combinations. In the frequency combination (f0-f1-f3) the first frequency is f0, the second frequency is f1, and the third frequency is f4. In the frequency combination (f0-f1-f3) the first frequency is f0, the second frequency is f1, and the third frequency is f3. Then, first frequencies in the frequency combinations (f0-f1-f4) and (f0-f1-f3) are identical, both being f0. Second frequencies in the frequency combinations (f0-f1-f4) and (f0-f1-f3) are identical, both being f1. Thus, first frequencies in the frequency combination (f0-f1-f4) and the frequency combination (f0-f1-f3) are spliced, and second frequencies in the frequency combination (f0-f1-f4) and the frequency combination (f0-f1-f3) are spliced. For example, as shown in FIG. 6, first frequencies of data bits "1" and "2" are connected directly.

In other examples, the ultrasonic waves of the two successive frequency combinations may be sent through frequency modulation based on the frequencies of the same ordinal logic in the two successive frequency combinations, as follows.

If the frequencies of the same ordinal logic in the two successive frequency combinations are different, a shift frequency may be acquired by performing frequency shift on the frequencies of the same ordinal logic in the two successive frequency combinations.

The shift frequency may be spliced in between the frequencies of the same ordinal logic in the two successive frequency combinations, acquiring the two successive frequency combinations subject to splicing processing.

The ultrasonic waves of frequencies of the two successive frequency combinations subject to splicing processing may be sent.

The two successive frequency combinations here may be frequency combinations corresponding to two successive pieces of target data. Thus, S13 may also be implemented as follows. If the frequencies of the same ordinal logic in the frequency combinations corresponding to the two successive pieces of the target data are different, a shift frequency may be acquired by performing frequency shift on the frequencies of the same ordinal logic in the frequency combinations corresponding to the two successive pieces of the target data. The shift frequency may be spliced in between the frequencies of the same ordinal logic in the frequency combinations corresponding to the two successive pieces of the target data, acquiring frequencies of the frequency combinations corresponding to the two pieces of the target data subject to splicing processing. The ultrasonic waves of the frequencies of the frequency combinations corresponding to the two pieces of the target data subject to splicing processing may be sent.

For example, as shown in FIG. 6, data bits "12" to be sent may correspond to respective frequency combinations (f0-f1-f4) and (f0-f1-f3). The data bit "1" corresponds to the frequency combination (f0-f1-f4). The data bit "2" corresponds to the frequency combination (f0-f1-f3). Then, frequency combinations (f0-f1-f4) and (f0-f1-f3) are two successive frequency combinations. In the frequency combination (f0-f1-f4) the first frequency is f0, the second frequency is f1, and the third frequency is f4. In the frequency combination (f0-f1-f3) the first frequency is f0, the second frequency is f1, and the third frequency is f3. Then, first frequencies in the frequency combinations (f0-f1-f4) and (f0-f1-f3) are identical, both being f0, and second frequencies in the frequency combinations (f0-f1-f4) and (f0-f1-f3) are identical, both being f1. Thus, frequency shift may have to be performed on third frequencies in the frequency combinations (f0-f1-f4) and (f0-f1-f3), acquiring a shift rate. The shift rate may be spliced in between the third frequencies in the frequency combinations (f0-f1-f4) and (f0-f1-f3), acquiring third frequencies in the frequency combinations (f0-f1-f4) and (f0-f1-f3) subject to slicing processing. For example, as shown in FIG. 6, frequency shift, and then slicing processing, may be performed on third frequencies of data bits "1" and "2".

Here, frequency shift may be performed on corresponding frequencies in frequency combinations corresponding to two successive pieces of the target data, acquiring a shift frequency, as follows.

a frequency shift speed may be determined based on a frequency in a first frequency combination and a corresponding frequency in a second frequency combination of the frequency combinations corresponding to the two successive pieces of the target data.

The shift frequency may be determined based on the frequency in the first frequency combination of the frequency combinations corresponding to the two successive pieces of the target data, and the frequency shift speed.

For example, in one example, the frequency combinations corresponding to two successive pieces of target data are (f0-f1-f2) and (f1-f2-f3), respectively. The frequency shift speeds of frequencies of the frequency combinations acquired are $$k_0 = \frac{(f1-f0)}{N},$$

$$k_1 = \frac{(f2-f1)}{N}, \text{ and } k_2 = \frac{(f3-f2)}{N}.$$

Shift frequencies of frequencies of the frequency combinations acquired are $f_{0r}=f0+k_0t$, $f_{1r}=f1+k_1t$, and $f_{2r}=(f2+k_2t)$, respectively. The acquired ultrasonic waves corresponding to the shift frequencies may be $y=\sin(2\pi(f0+k_0t)t)+\sin(2\pi(f1+k_1t)t)+\sin(2\pi(f2+k_2t)t)$.

Here, the y may be the ultrasonic waves corresponding to the shift frequency. The t may be the time between sending ultrasonic waves corresponding to two successive pieces of the target data. Here the t=0, 1, . . . , (N−1).

For example, referring again to FIG. 6, the third frequency in the frequency combination corresponding to the data bit "1" is "f4", and the third frequency in the frequency combination corresponding to the data bit "2" is "f3". Then, third frequencies of successive data bits "1" and "2" differ. As shown in FIG. 6, the third frequencies of the data bits "1" and "2" may be connected through frequency modulation.

In examples of the present disclosure, if two or more pieces of target data exist, after the ultrasonic waves corresponding to the first piece of target data have been sent, it may be switched, through frequency modulation, direct to sending the ultrasonic waves of frequencies in the frequency combination corresponding to the second piece of target data. In this way, compared to ultrasonic waves based on the frequency combination corresponding to a single piece of target data in case of multiple pieces of target data, the next piece of target data may be sent without waiting for the encoder to feed back a message confirming the previous piece of target data, greatly reducing time sending the ultrasonic waves of the frequency combinations corresponding to the multiple pieces of target data, improving efficiency in transmitting the ultrasonic waves.

Moreover, the mode of frequency modulation provided in the present disclosure allows smooth transition from the frequency combination corresponding to the previous piece of target data to the frequency combination corresponding to the next piece of target data, further reducing an interfering signal.

In some examples, the method may include an option as follows.

A fade-in frequency may be added before each frequency in the frequency combination corresponding to the first piece of target data, and/or a fade-out frequency may be added after each frequency in the frequency combination corresponding to the previous piece of target data.

Ultrasonic waves of frequencies in a frequency combination may be sent as follows.

Ultrasonic waves of frequencies in a frequency combination incorporating a fade-in frequency and/or a fade-out frequency may be sent.

The fade-in frequency may be identical to a corresponding frequency in the frequency combination corresponding to the first piece of target data. The fade-out frequency may differ from a corresponding frequency in the frequency combination corresponding to the last piece of target data.

The fade-in here may be a linear interpolation or a logarithmic interpolation. The fade-out may also be a linear interpolation or a logarithmic interpolation.

Figure 8:
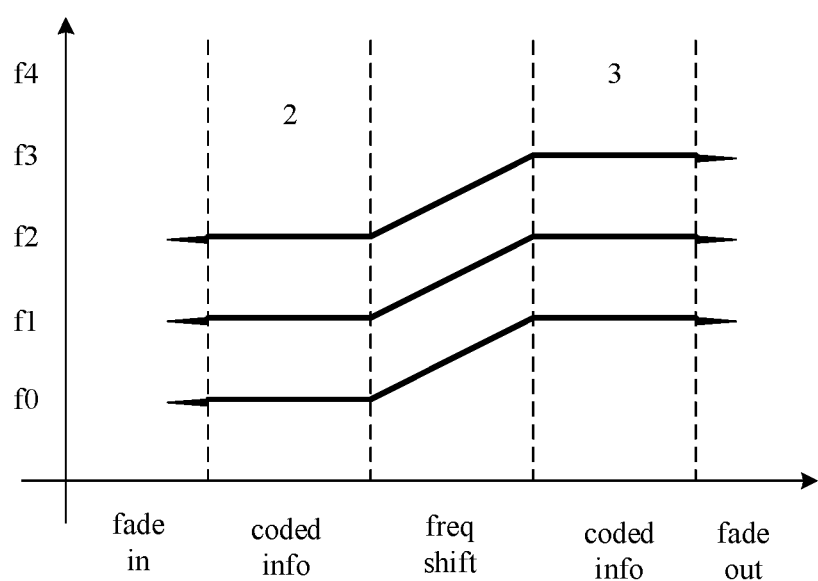
FIG. 8 is an illustrative diagram of different frequency combinations according to an example.

For example, if the target data "2" correspond to a frequency combination (f0-f1-f2) and the target data "3" correspond to a frequency combination (f1-f2-f3), then a diagram of combined frequencies of ultrasonic waves corresponding to target data "23" may be as shown in FIG. 8. There may be a corresponding fade-in frequency (f0-f1-f2) before the frequency combination (f0-f1-f2), and a corresponding fade-out frequency (f1-f2-f3) after the frequency combination (f1-f2-f3).

In examples of the present disclosure, a fade-in frequency may be inserted before the frequency combination of the first piece of target data in the ultrasonic waves in a fade-in mode, and/or a fade-out frequency may be inserted after the frequency combination of the last piece of target data in a fade-out mode. In this way, the audio signal of the ultrasonic waves is allowed to smoothly fade in and/or fade out, lowering interference, reducing noise.

Further, compared to insertion of a fade-in frequency before each piece of target data and a fade-out frequency after each piece of target data, a fade-in frequency is inserted before the frequency combination of the first piece of target data and a fade-in frequency is added after the frequency combination of the last piece of target data, and a shift frequency is added between combination frequencies of two successive pieces of target data, greatly reducing the duration of the entire ultrasonic waves while reducing noise, improving efficiency in transmitting the ultrasonic waves.

In some examples, S13 may be implemented as follows.

If there are two or more pieces of the target data, and an instruction of successful decoding of the ultrasonic waves corresponding to the n-th piece of the target data is received after transmitting ultrasonic waves corresponding to an n-th piece of the target data, ultrasonic waves of frequencies in a frequency combination corresponding to an (n+1)-th piece of the target data may be sent within an (n+1)-th preset duration. Then may be an integer greater than 0.

Here, the instruction of successful decoding of the ultrasonic waves corresponding to the n-th piece of the target data may be received as follows. The instruction of successful decoding sent by the decoding equipment may be received. Alternatively, an instruction of successful decoding sent by a cloud service may be received.

In examples of the present disclosure, after the ultrasonic waves corresponding to a previous piece of target data have been sent, ultrasonic waves of frequencies in the frequency combination corresponding to the next piece of target data are not sent until an instruction of successful decoding of the ultrasonic waves corresponding to the previous piece of target data is received, ensuring that the decoding equipment successfully decoding the target data, improving accuracy in successful decoding of target data.

It should be noted here that a method for processing ultrasonic waves below may be applied to decoding equipment, and is similar to description of an aforementioned method for processing ultrasonic waves applied to the coding equipment. For any technical detail not disclosed in an example for the method for processing ultrasonic wave applied to the decoding equipment in the present disclosure, please refer to description of an aforementioned example for a method for processing ultrasonic waves applied to the coding equipment, which is not elaborated here. These details are also included within the scope of the present disclosure.

Figure 9:
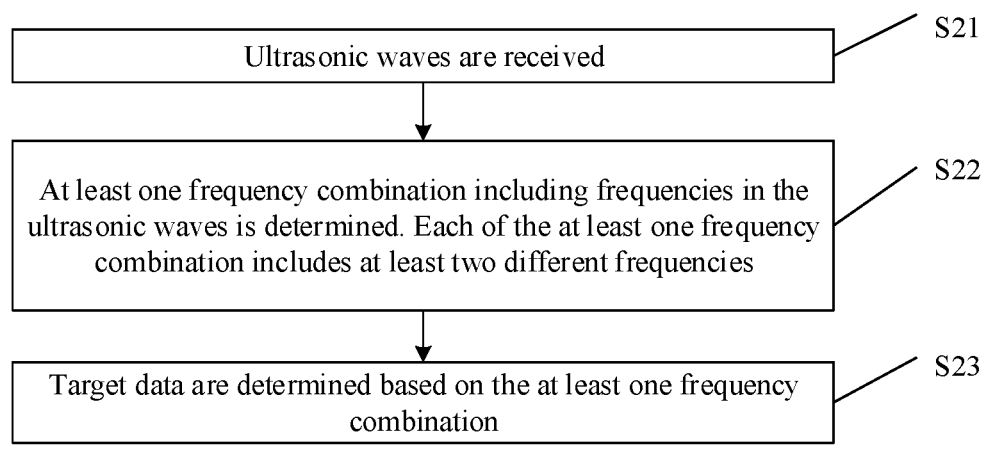
FIG. 9 is an illustrative diagram of a method for processing ultrasonic waves according to an example.

As shown in FIG. 9, there is provided a method for processing ultrasonic waves. The method includes a step as follows.

In S21, ultrasonic waves are received.

In S22, at least one frequency combination including frequencies is determined in the ultrasonic waves. Each of the at least one frequency combination includes at least two different frequencies.

In S23, target data are determined based on the at least one frequency combination.

The method for processing ultrasonic waves according to examples of the present disclosure may be applied to decoding equipment. The decoding equipment here may be a mobile phone, a computer, a server, sending equipment, a tablet computer, medical equipment, wearable equipment, etc. The decoding equipment here may also be any equipment having a decoder. Alternatively, the decoding equipment may be any equipment including a decoding module or component, or capable of implementing a decoding function, etc. The decoding equipment here may also be any ultrasonic wave receiving equipment.

In some examples, S22 is implemented as follows.

If it is determined that the ultrasonic waves carry a wake-up frequency, the at least one frequency combination including the frequencies in the ultrasonic waves may be determined based on the wake-up frequency.

In examples of the present disclosure, after receiving the ultrasonic waves, if it is determined that there is a wake-up frequency in the ultrasonic waves, a module capable of decoding or a decoder, etc., in the decoding equipment may be waked based on the wake-up frequency. Therefore, the decoder or the module with the decoding function does not have to be kept in an operating state of decoding all the time, greatly reducing power consumption of the decoding equipment.

Referring again to FIG. 6, the wake-up frequency may be 1 KHZ, 2 KHZ, 3 KHZ, etc. In other examples, the wake-up frequency may be another frequency, provided that it differs from any frequency of any frequency combination corresponding to the target data.

In some examples, the method further includes an option as follows.

If ultrasonic waves of a wake-up frequency is received, a recording module may be started.

The ultrasonic waves may be recorded based on the recording module.

Thus, the ultrasonic waves may be recorded, allowing the decoding equipment to identify the target data of the ultrasonic waves.

In some examples, the method includes an option as follows.

Frequency energy of the frequencies at an i-th time point and an (i−1)-th time point may be acquired based on the ultrasonic waves.

The at least one frequency combination including the frequencies may be determined in the ultrasonic waves as follows.

If the frequency energy of the frequencies at the i-th time point and the (i−1)-th time point meets an onset marker condition, the frequencies at the i-th time point may be determined as frequencies in a first frequency combination. The i may be an integer greater than 1.

It may be determined that the frequency energy of the frequencies at the i-th time point and the (i−1)-th time point meets the onset marker condition, as follows.

It may be determined that frequency energy of each frequency at the i-th time point is greater than an energy threshold corresponding to the each frequency at the i-th time point.

In addition, it may be determined that frequency energy of each frequency at the (i−1)-th time point is less than an energy threshold corresponding to the each frequency at the (i−1)-th time point.

In a practical application, there is provided a method for computing frequency energy of a frequency, including options as follows.

First, a decoder performs sampling at a specific sampling rate, such as FS=48000 HZ. Ultrasonic waves x(n) are converted, based on a time sequence in which the ultrasonic waves are received, into k data frames, such as $x_1, x_2 \ldots x_k$. The k is a sequence number of a frame. A windowing operation is performed on each data frame, acquiring a windowed data frame $x_{w1}, x_{w2} \ldots x_{wk}$. $x_{w1}$=window $(x_i)$. The i is an integer less than or equal to k and greater than 0. The function "window" is configured to represent a window function, which may be, for example, a Hamming window. Here, the ultrasonic waves may be converted into k data frames based on a frame length L. The L is an integer power of 2. The L is a number of frequencies corresponding to a frame of data.

Then, a windowed data frame is transformed from time domain to frequency domain, acquiring frequency domain data of the frame. For example, a windowed data frame may be subjected to a Fourier transform FFT, acquiring frequency domain data of each frame $X_1, X_2 \ldots X_k$. $X_i$=FFT $(x_{wi})$. The i is an integer less than or equal to k and greater than 0.

Thirdly, frequency energy of a frequency corresponding to a frequency domain data frame is computed. For example, average energy $W(x)=X_i(x)X^*_i(x)$ of a frequency of a frame is computed. The $X^*_i(x)$ is the conjugate matrix of $$X_i(x). \ x = \text{round}\left(\frac{f \times L}{FS}\right).$$

The f is the frequency of a start bit.

For example, in one example, if the frequency of the start bit is f=20000, L=128, FS=48000, then $$x = \text{round}\left(\frac{20000 \times 128}{48000}\right) = 53.$$

If $X_i(53)=0.025+0.012i$, then $W=(0.025+0.012i)\times(0.025-0.012i)=0.000769$. Here, $X_i(53)=0.025+0.012i$ is but an illustrative example. Of the $X_i(53)$, the real part is "0.25", and the imaginary part is "0.12i". In other examples, $X_i(53)$ may be formed by other real parts and imaginary parts.

In one example, frequency energy of a frequency at a time point is computed as $W_{mean}(x)|_{t=i}$=Average $\{W(x)\}|_{t=i-k, \ldots, i}$. Here, computation is performed taking s frames. The s is greater than the k. Frequency energy of a frequency is averaged over k frames. After averaging over k frames is computed, computation continues for the next k frames, and so on, to compute the mean frequency energy of each frequency. Here, $W_{mean}(x)|_{t=i}$ represents mean frequency energy of a frequency x at time i. That is, $W_{mean}(x)|_{t=i}$ represents average energy of the frequency x at time i. The x is a frequency in a frequency combination subject to FFT.

In a practical application, an energy threshold of a frequency may be computed in advance. For example, a total of s−k+1 mean values are acquired in the s frames according to $W_{mean}(x)|_{t=i}$=Average$\{W(x)\}|_{t=i-k, \ldots, i}$. A maximum $W_{max}(x)|_{t=i}$=Max$\{W_{mean}(x)\}|_{t=i-s, \ldots, i}$ and a minimum $W_{min}(x)|_{t=i}$=Min$\{W_{mean}(x)\}|_{t=i-s, \ldots, i}$ of the frequencies are computed respectively. The energy threshold Threshold(x)= k'×($W_{max}(x)|_{t=i}$+$W_{min}(x)|_{t=i}$) of a frequency is computed. The Threshold (x) is the energy threshold of a frequency. The k' is a factor for adjusting the energy threshold.

For example, the frequency combination (f0-f1-f2) corresponding to the target data "2" as shown in FIG. 8 may be determined as a first frequency combination with an onset marker condition of a frequency as follows.

$$\begin{cases} W(f_0)|_{t=i} > \text{Threshold } (f_0) \\ W(f_0)|_{t=i-1} < \text{Threshold } (f_0) \end{cases}.$$

$$\begin{cases} W(f_1)|_{t=i} > \text{Threshold } (f_1) \\ W(f_1)|_{t=i-1} < \text{Threshold } (f_1) \end{cases}.$$

$$\begin{cases} W(f_2)|_{t=i} > \text{Threshold } (f_2) \\ W(f_2)|_{t=i-1} < \text{Threshold } (f_2) \end{cases}.$$

The $W(f_0)|_{t=i}$ is the frequency energy of the frequency f0 in the frequency combination at the i-th time point. The $W(f_0)''_{t=i-1}$ is the frequency energy of the frequency f0 in the frequency combination at the (i−1)-th time point. The Threshold ($f_0$) is the energy threshold of f0 in the frequency combination. The $W(f_1)|_{t=i}$ is the frequency energy of the frequency f1 in the frequency combination at the i-th time point. The $W(f_1)|_{t=i-1}$ is the frequency energy of the frequency f1 in the frequency combination at the (i−1)-th time point. The Threshold ($f_1$) is the energy threshold of f1 in the frequency combination. The $W(f_2)|_{t=i}$ is the frequency energy of the frequency f2 in the frequency combination at the time point i. The $W(f_2)|_{t=i-1}$ is the frequency energy of the frequency f2 in the frequency combination at the (i−1)-th time point. The Threshold ($f_2$) is the energy threshold of f2 in the frequency combination.

In examples of the present disclosure, when each frequency at the i-th time point and the (i−1)-th time point meets an aforementioned onset marker condition, it may be determined that frequencies corresponding to the i-th time point are frequencies of the first frequency combination, i.e., determining that the i-th time point is the onset of the start bit in the target data. Thus, target data of the other bits may be received in chronological order according to the onset of the start bit.

Moreover, in examples of the present disclosure, the energy threshold of a frequency may be determined dynamically by the onset marker condition, instead of being a preset energy threshold, thus better adapted to various complex environments.

In some examples, the at least one frequency combination including the frequencies may be determined in the ultrasonic waves as follows.

Frequency energy of each frequency may be acquired based on the ultrasonic waves.

If a number of frequencies, of which frequency energy of each frequency acquired based on the ultrasonic waves is greater than an energy threshold corresponding to the each frequency, exceeds a preset number, it may be determined that the frequencies acquired from the ultrasonic waves are the frequencies of the at least one frequency combination.

In a practical application, the decoding equipment may acquire frequency combinations one by one from the ultrasonic waves chronologically. The frequency combinations include at least two different frequencies. When the decoding equipment acquires ultrasonic waves, the frequencies may be acquired from the ultrasonic waves. Frequency energy of the frequencies may be computed based on a computing module. Thus, the decoding equipment determines whether a frequency may be part of a frequency combination by determining whether the frequency energy of the frequency acquired from the ultrasonic waves is greater than the energy threshold corresponding to the frequency.

Figure 10:
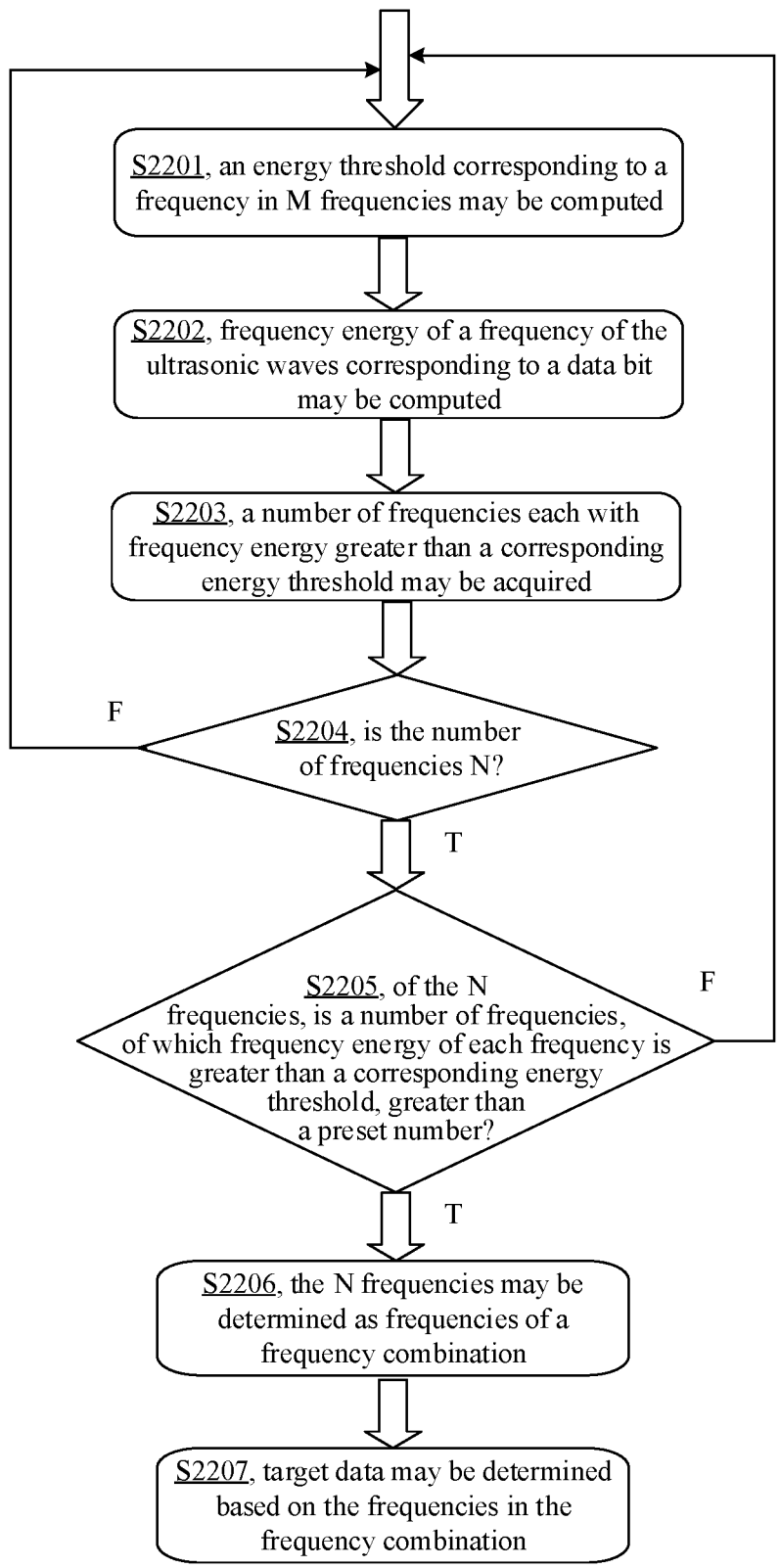
FIG. 10 is an illustrative diagram of a method for processing ultrasonic waves according to an example.

It will be appreciated that frequencies acquired from the ultrasonic waves may be at least any two frequencies, or may be at least two random frequencies. In examples of the present disclosure, after receiving ultrasonic waves through an encoder, at least two frequencies are extracted from the ultrasonic waves, and it is determined whether the at least two frequencies form a frequency combination. It may be determined whether at least two frequencies form a frequency combination through the frequency energy of the at least two frequencies. For example, as shown in FIG. 10, there is provided a method for processing ultrasonic waves, including steps as follows.

In S2201, an energy threshold of a frequency corresponding to M frequencies may be computed.

In a possible example, assume that the M frequencies are f0, f1, f2, f3, and f4. According to the formula Threshold (x)=k'×($W_{max}(x)|_{t=i}$+$W_{min}(x)|_{t=i}$) for computing frequency energy corresponding to a frequency, the decoding equipment computes energy thresholds Threshold ($f_0$), Threshold ($f_1$), Threshold ($f_2$), Threshold ($f_3$), and Threshold ($f_4$) corresponding respectively to the M frequencies.

In S2202, frequency energy of a frequency of the ultrasonic waves corresponding to a data bit may be computed.

In a possible example, the decoding equipment computes the frequency energy $W_{mean}(x)|_{t=i}$=Average $\{W(x)\}|_{t=i-k, \ldots, i}$ of the ultrasonic waves corresponding to a data bit can according to the ultrasonic waves corresponding to the data bit. The $W_{mean}(x)|_{t=i}$ average frequency energy of a frequency x at time i. The x denotes a frequency in the frequency combination subject to FFT.

A data bit here may correspond to a frequency combination. For example, the data bit is 0, and corresponds to a frequency combination (f0-f1-f2).

Here, in a practical application, ultrasonic waves corresponding to a data bit may be ultrasonic waves within a predetermined duration. The preset duration may include k frames of ultrasonic waves. The k may be an integer greater than 1. For example, the k is 10.

In S2203, a number of frequencies each with frequency energy greater than a corresponding energy threshold may be acquired.

In a possible example, when determining that the frequency energy $W_{mean}(x)|_{t=i}$ is greater than the energy threshold Threshold(x) corresponding to the frequency, the decoding equipment acquires the number of frequencies each with frequency energy greater than the corresponding energy threshold.

In S2204, it may be determined whether the number of frequencies is equal to N. If it is N, S2205 may be performed. Otherwise if it is not N, S2201 may be performed.

In a possible example, the decoding equipment determines whether the number of frequencies each with frequency energy greater than the corresponding energy threshold is equal to N. If it is N, S2205 may be performed. Otherwise if it is not N, S2201 may be performed.

Here, the N may be less than or equal to the M. For example, the N is 3.

In S2205, of the N frequencies, it may be determined whether a number of frequencies, of which the frequency energy of each frequency is greater than the energy threshold of the each frequency, is greater than a predetermined number. If it is greater than the predetermined number, S2206 may be performed. Otherwise if it is not, S2201 may be performed.

In a possible example, the decoding equipment determines, of the N frequencies, whether a number of frequencies, of which the frequency energy of each frequency is greater than the energy threshold of the each frequency, is greater than a predetermined number. If it is greater than the predetermined number, S2206 may be performed. Otherwise if it is not, S2201 may be performed.

The predetermined number here may be equal to or greater than 3.

In S2206, the N frequencies may be determined as frequencies of a frequency combination.

In a possible example, the decoding equipment determines the N frequencies as frequencies of a frequency combination.

For example, the decoding equipment continuously receives the ultrasonic waves, and determines that f0, f1, and f2 are frequencies in a frequency combination when detecting, within a predetermined duration, that more than 5 frequency points corresponding to the frequency f0 in the ultrasonic waves have frequency energy greater than the energy threshold corresponding to the frequency f0, that more than 5 frequency points corresponding to the frequency f1 in the ultrasonic waves have frequency energy greater than the energy threshold corresponding to the frequency f1, and that more than 5 frequency points corresponding to the frequency f2 in the ultrasonic waves have frequency energy greater than the energy threshold corresponding to the frequency f2.

In S2207, target data may be determined based on the frequencies in the frequency combination.

In a possible example, the decoding equipment determines target data based on the frequencies in the frequency combination.

For example, if it is determined that f0, f1, and f2 are frequencies in the frequency combination, target data 2 may be determined based on (f0-f1-f2) and the correspondence between a frequency combination and a piece of target data.

In examples of the present disclosure, frequencies of a frequency combination may be determined based on determining that the number of frequency points each with frequency energy greater than the corresponding frequency energy threshold in the ultrasonic waves being greater than a predetermined number. Thus, accuracy in receiving decoded data may be improved, improving a success rate and accuracy of decoding target data.

In addition, in examples of the present disclosure, compared to decoding a piece of target data or a data bit based on a single frequency, decoding a piece of target data or a data bit based on at least two frequencies allows to lower a bit error rate, increasing a probability of acquiring correct target data.

Moreover, in examples of the present disclosure, since a frequency combination corresponding to one piece of target data or a data bit includes a fixed number of frequencies per preset duration, computation is to be performed for the fixed number of frequencies for each frequency combination, thus greatly reducing difficulty in determining an energy threshold, simplifying a computation process of acquiring each frequency in each frequency combination.

In some examples, the method further includes at least one option as follows.

It may be determined, based on the target data, to start an application.

Display of an interface of the application may be triggered based on the target data.

A payment operation based on the application may be triggered based on the target data.

Information may be sent based on the target data.

A connection with coding equipment may be established based on the target data.

In other examples, if the target data are a WIFI password, WIFI may be connected according to the target data. Alternatively, if the target data are a password to a lock, an unlocking operation may be performed according to the target data, etc.

In examples of the present disclosure, decoding equipment may receive and decode ultrasonic waves to acquire target data, so that various functions may be completed corresponding to indication of the target data, such as waking up a payment interface, making a payment, establishing a connection, etc. In this way, manual operation by a user is not needed. The decoding equipment may operate automatically based on the received ultrasonic waves, facilitating the user and saving operation time, improving user experience.

In one example, the method further includes an option as follows.

After the n-th piece of target data in the ultrasonic waves has been identified, a decoding success instruction to the coding equipment or the cloud server indicating successful decoding for the n-th piece of target data. The decoding success instruction may be configured to trigger sending ultrasonic waves corresponding to the (n+1)-th piece of target data by the coding equipment. The n may be an integer greater than 0.

In examples of the present disclosure, after a piece of target data has been acquired via successful decoding, a decoding success instruction may be sent to the coding equipment or the cloud server, so that the decoding equipment continues to send ultrasonic waves of the next piece of target data, further improving a success rate of decoding target data.

Specific examples are provided below with reference to any example above.

Example 1

Figure 11:
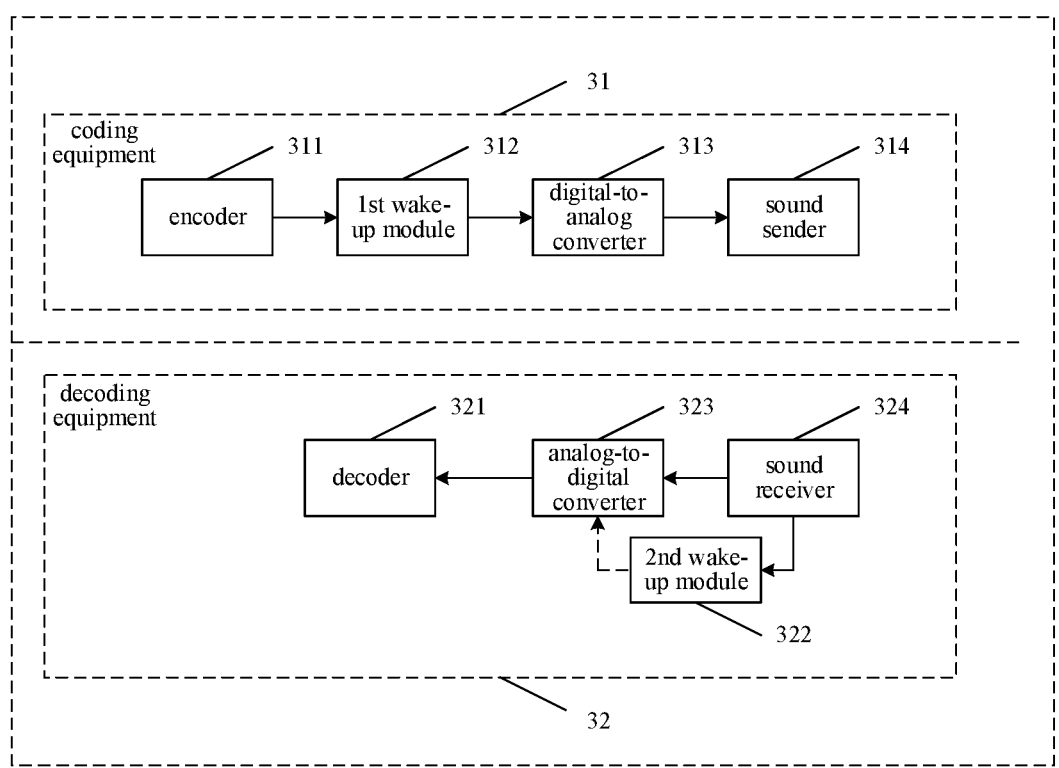
FIG. 11 is a block diagram of a device for coding and decoding ultrasonic waves according to an example.

FIG. 11 discloses a device for coding and decoding. The device may include coding equipment 31 and decoding equipment 32. The coding equipment includes an encoder 311, a first wake-up module 312, a digital-to-analog converter 313, and a sound sender 314. The decoding equipment includes a decoder 321, a second wake-up module 322, an analog-to-digital converter 323, and a sound receiver 324.

The present disclosure also provides a coding and decoding method including a step as follows.

In a first step, the encoder 311 is configured to convert the target data to be transmitted into a frequency combination corresponding to the target data based on a correspondence between data to be transmitted and a frequency combination. One of the frequency combinations may include at least two different frequencies.

In a second step, the second wake-up module 322 is configured to add a wake-up frequency to the frequency combination, generating ultrasonic waves carrying a wake-up signal. The wake-up signal is generated based on the wake-up frequency. The wake-up frequency may differ from frequencies in the frequency combination.

In a third step, the digital-to-analog converter 313 is configured to convert ultrasonic waves of a digital signal into ultrasonic waves of an analog signal.

In a fourth step, the sound sender 314 is configured to convert the transmission into ultrasonic waves of an analog signal.

In a fifth step, the sound receiver 324 is configured to receive ultrasonic waves of an analog signal.

In a sixth step, the analog-to-digital converter 323 is configured to convert the ultrasonic waves of an analog signal into ultrasonic waves of a digital signal.

In a seventh step, the second wake-up module 322 is configured to determine whether there is a wakeup signal in the ultrasonic waves. If there is, a wake-up instruction may be sent to wake the analog-to-digital converter. After receiving the wake-up instruction, the analog-to-digital converter may convert, based on the wake-up instruction, the ultrasonic waves of the analog signal into the ultrasonic waves of the digital signal using a sampling rate greater than a preset sampling rate, and send the ultrasonic waves of the digital signal to the decoder.

In a possible example, the second wake-up module also sends a wake-up instruction to the decoder. The decoder may start a working mode based on the wake-up instruction. In the working mode, the decoder may decode the ultrasonic waves of the digital signal.

In an eighth step, the decoder 321 may be configured to decode the ultrasonic waves of the digital signal based on the correspondence, acquiring the target data.

Figure 12:
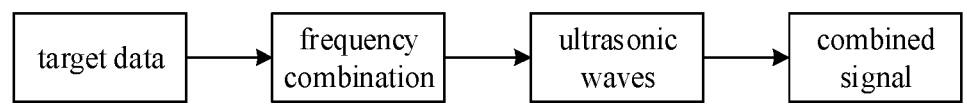
FIG. 12 is an illustrative diagram of a method for processing ultrasonic waves according to an example.

In a possible example, the signal flow direction of the first step to the fourth step may be as shown in FIG. 12, where a frequency combination is generated based on the target data, ultrasonic waves are generated based on the frequency combination, and a combined signal is generated based on the ultrasonic waves and the wake-up signal. The combined signal is the ultrasonic waves carrying the wake-up signal.

Figure 13:
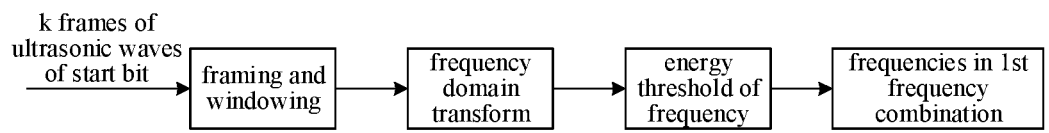
FIG. 13 is an illustrative diagram of a method for processing ultrasonic waves according to an example.
Figure 14:
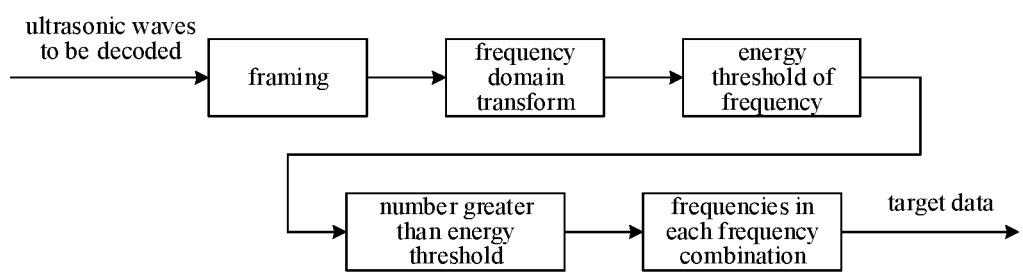
FIG. 14 is an illustrative diagram of a method for processing ultrasonic waves according to an example.

In a possible example, the decoding equipment determines to decode the ultrasonic waves, including determination of the target data of the first frequency combination in the ultrasonic waves, as shown in FIG. 13, and determination of the target data of each frequency combination in the ultrasonic waves, as shown in FIG. 14.

As shown in FIG. 13, the target data of the first frequency combination may be determined as follows. k frames of ultrasonic waves of the start bits may be received. The k may be an integer greater than 1. Each frame of ultrasonic waves may be framed and windowed. Each frame of ultrasonic waves in time domain may be converted into frequency domain. An energy threshold of a frequency corresponding to each frequency point may be computed. Frequencies in a first frequency combination may be determined based on an onset marker condition. The first piece of target data may be determined based on the frequencies in the first frequency combination.

As shown in FIG. 14, the target data of each frequency combination in the ultrasonic waves may be determined as follows. receiving the ultrasonic waves of each k frames. Each of the k frames of ultrasonic waves in time domain may be converted into that in frequency domain. An energy threshold of a frequency point corresponding to a frequency may be computed. A number of frequencies each with frequency energy greater than a corresponding energy threshold in the k frames may be computed. A frequency may be determined as a frequency of a frequency combination based on the number. Target data corresponding to a frequency combination may be determined based on frequencies in the frequency combination.

In examples of the present disclosure, compared to sending target data based on a single frequency, sending target data through a multi-frequency combination allows to lower a bit error rate, providing good interference immunity.

Furthermore, with examples of the present disclosure, a wake-up signal may be sent by being carried in ultrasonic waves. When the decoding equipment receives the ultrasonic waves, the analog-to-digital converter may be waked if it is determined that there is a wake-up signal in the ultrasonic waves, to collect the ultrasonic waves at a high sampling rate and wake up the decoder, such that the analog-to-digital converter does not have to stay in a working state of a high sampling rate, and the decoder does not have to stay in a working state of decoding ultrasonic waves, greatly reducing power consumption of the analog-to-digital converter and the decoder in the decoding equipment.

Figure 15:
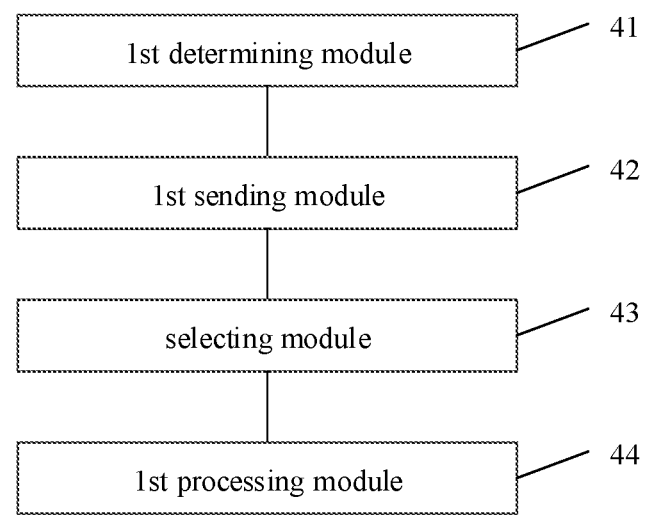
FIG. 15 is a block diagram of a device for processing ultrasonic waves according to an example.

FIG. 15 provides a device for processing ultrasonic waves according to an example. The device for processing ultrasonic waves is applied to coding equipment, and includes a first determining module and a first sending module.

The first determining module 41 is configured to determine a frequency combination corresponding to target data to be transmitted. The frequency combination includes at least two different frequencies.

The first sending module 42 is configured to send ultrasonic waves of frequencies in the frequency combination within a predetermined duration.

In some examples, the device includes a selecting module and a first processing module.

The selecting module 43 may be configured to select M frequencies.

The selecting module 43 may also be configured to select any N frequencies of the M frequencies as a combination of frequencies. Both the M and the N may be integers greater than 1. The M may be greater than the N.

The first processing module 44 may be configured to establish a correspondence between data to be transmitted and the combination of frequencies.

The first determining module 41 may be configured to determine the frequency combination corresponding to the target data according to the correspondence.

In some examples, the first processing module 44 is configured to add a wake-up frequency to the ultrasonic waves. The wake-up frequency may be configured to wake up decoding equipment.

The first sending module 42 may be configured to send, within the predetermined duration, the ultrasonic waves of the frequencies in the frequency combination carrying the wake-up frequency.

In some examples, the wake-up frequency is less than each frequency in the frequency combination.

In some examples, the first sending module is configured to, in response to two or more pieces of the target data, after ultrasonic waves corresponding to an n-th piece of the target data have been transmitted, switch, through frequency modulation, to sending ultrasonic waves of frequencies in a frequency combination corresponding to an (n+1)-th piece of the target data within an (n+1)-th preset duration. The n may be an integer greater than 0.

In some examples, the first sending module 42 is configured to, in response to two or more pieces of the target data, and receiving an instruction of successful decoding of the ultrasonic waves corresponding to the n-th piece of the target data after transmitting ultrasonic waves corresponding to an n-th piece of the target data, send, within an (n+1)-th preset duration, ultrasonic waves of frequencies in a frequency combination corresponding to an (n+1)-th piece of the target data. The n may be an integer greater than 0.

In some examples, the first determining module 41 is configured to, in response to two or more pieces of the target data, acquire two successive frequency combinations corresponding to two successive pieces of the target data.

The first sending module 42 is configured to send ultrasonic waves of the two successive frequency combinations through frequency modulation based on frequencies of a same ordinal logic in the two successive frequency combinations.

In some examples, the first sending module 42 is configured to, in response to the frequencies of the same ordinal logic in the two successive frequency combinations being identical, perform splicing processing on the frequencies of the same ordinal logic in the two successive frequency combinations, and send the ultrasonic waves of frequencies of the two successive frequency combinations subject to splicing processing.

In some examples, the first sending module 42 is configured to, in response to the frequencies of the same ordinal logic in the two successive frequency combinations being different, acquire a shift frequency by performing frequency shift on the frequencies of the same ordinal logic in the two successive frequency combinations, and splice the shift frequency in between the frequencies of the same ordinal logic in the two successive frequency combinations, acquiring the two successive frequency combinations subject to splicing processing.

The first sending module 42 may be further configured to send the ultrasonic waves of frequencies of the two successive frequency combinations subject to splicing processing.

In some examples, the target data are configured to implement at least one of:

starting an application of decoding equipment;

triggering display of an interface of the application by the decoding equipment;

triggering a payment operation by the decoding equipment based on the application;

triggering return of information by the decoding equipment; or triggering establishment of a connection with the coding equipment by the decoding equipment.

Figure 16:
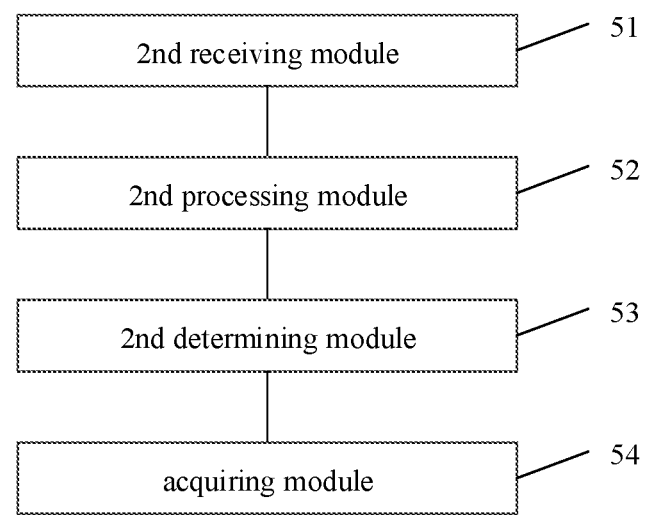
FIG. 16 is a block diagram of a device for processing ultrasonic waves according to an example.

FIG. 16 provides a device for processing ultrasonic waves according to an example. The device includes a second receiving module, a second processing module, and a second determining module.

The second receiving module 51 is configured to receive ultrasonic waves.

The second processing module 52 is configured to determine, in the ultrasonic waves, at least one frequency combination including frequencies. Each of the at least one frequency combination includes at least two different frequencies.

The second determining module 53 is configured to determine target data based on the at least one frequency combination.

In some examples, the second processing module 52 is configured to, in response to the ultrasonic waves carrying a wake-up frequency, determining, based on the wake-up frequency, the at least one frequency combination comprising the frequencies in the ultrasonic waves.

In some examples, the device includes an acquiring module.

The acquiring module 54 may be configured to acquire, based on the ultrasonic waves, frequency energy of the frequencies at an i-th time point and an (i−1)-th time point.

The second processing module 52 may be configured to, in response to the frequency energy of the frequencies at the i-th time point and the (i−1)-th time point meeting an onset marker condition, determine the frequencies at the i-th time point as frequencies in a first frequency combination. The i may be an integer greater than 1.

In some examples, the frequency energy of the frequencies at the i-th time point and the (i−1)-th time point meeting the onset marker condition may include:

frequency energy of each frequency at the i-th time point being greater than an energy threshold corresponding to the each frequency at the i-th time point; and frequency energy of each frequency at the (i−1)-th time point being less than an energy threshold corresponding to the each frequency at the (i−1)-th time point.

In some examples, the second processing module 52 is configured to acquire frequency energy of each frequency based on the ultrasonic waves; and in response to a number of frequencies, of which frequency energy of each frequency acquired based on the ultrasonic waves is greater than an energy threshold corresponding to the each frequency, exceeding a preset number, determine that the frequencies acquired from the ultrasonic waves are the frequencies of the at least one frequency combination.

In some examples, the method further includes at least one of:

determining, based on the target data, to start an application;

triggering, based on the target data, display of an interface of the application;

triggering, based on the target data, a payment operation based on the application;

sending, based on the target data, information; or establishing, based on the target data, a connection with coding equipment.

A module of the device according to an aforementioned example herein may perform an operation in a mode elaborated in an aforementioned example of the method herein, which will not be repeated here.

Examples of the present disclosure further provide electronic equipment, including a processor and a memory.

The memory is configured to store processor-executable instructions.

The processor is configured to implement the method for processing ultrasonic wave according to any example of the present disclosure when executing the executable instructions.

For example, the electronic equipment is coding equipment. The coding equipment then includes a processor and a memory.

The memory is configured to store processor-executable instructions.

The processor is configured to implement the method for processing ultrasonic wave applied to the coding equipment according to any example of the present disclosure when executing the executable instructions.

As another example, the electronic equipment is decoding equipment. The decoding equipment then includes a processor and a memory.

The memory is configured to store processor-executable instructions.

The processor is configured to implement the method for processing ultrasonic wave applied to the decoding equipment according to any example of the present disclosure when executing the executable instructions.

The memory may include various types of storage media, which are non-transitory computer storage media capable of continuing to memorize information stored thereon after communication equipment has been powered down.

The processor may be connected to the memory via a bus, etc., for reading an executable program stored on the memory, such as to implement at least one method as shown in FIGS. 3, 5, 7, 9-10.

Examples of the present disclosure further provide a computer-readable storage medium having stored therein an executable program which, when executed by a processor, implements the method for processing ultrasonic waves of any example of the present disclosure, such as to implement at least one method as shown in FIGS. 3, 5, 7, 9-10.

A module of a device according to an aforementioned example may perform an operation in a mode elaborated in an example of a method herein, which will not be repeated here.

Figure 17:
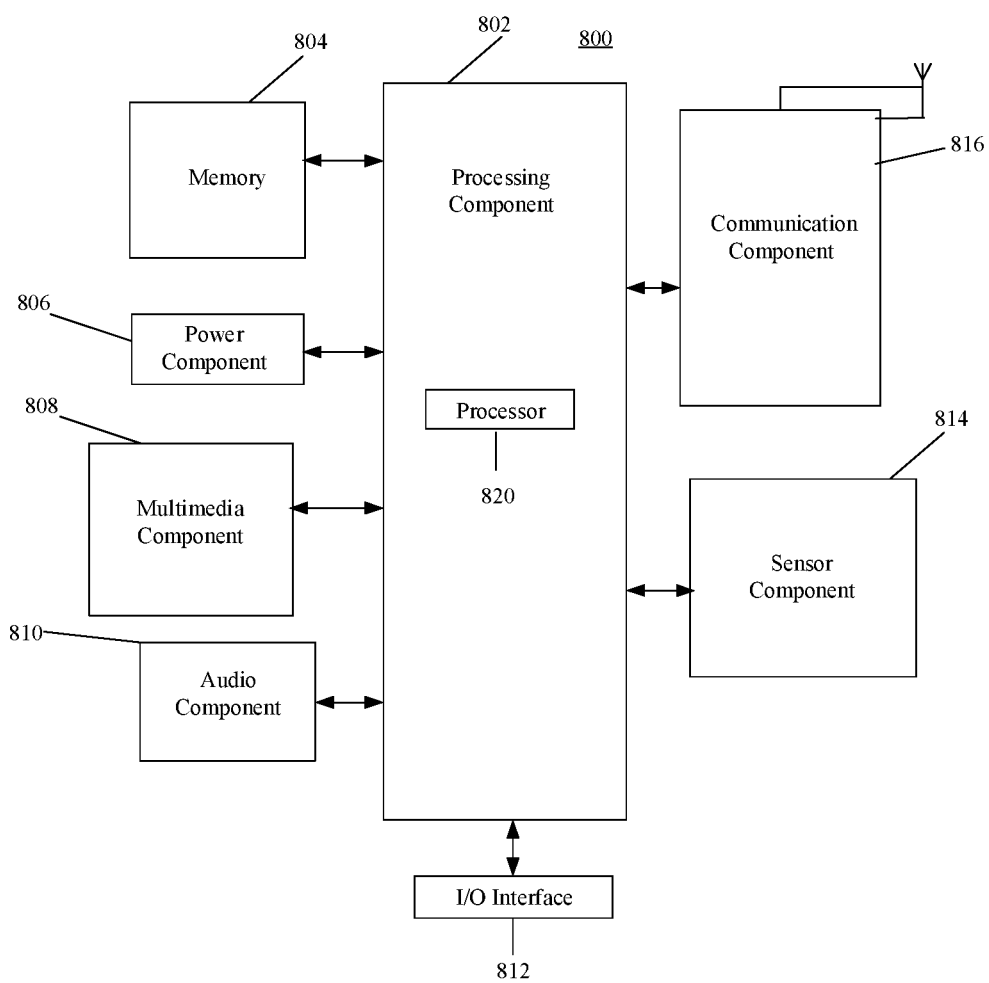
FIG. 17 is a block diagram of electronic equipment according to an example

FIG. 17 is a block diagram of electronic equipment 800 according to an example. For example, the electronic equipment 800 may be a mobile phone, a computer, a digital broadcasting terminal, a message transceiver, a game console, tablet equipment, medical equipment, fitness equipment, a Personal Digital Assistant (PDA), etc.

Referring to FIG. 17, the electronic equipment 800 may include one or more components as follows: a processing component 802, a memory 804, a power component 806, a multimedia component 808, an audio component 810, an Input/Output (I/O) interface 812, a sensor component 814, and a communication component 816.

The processing component 802 generally controls an overall operation of the display equipment, such as operations associated with display, a telephone call, data communication, a camera operation, a recording operation, etc. The processing component 802 may include one or more processors 820 to execute instructions so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation on the electronic equipment 800. Examples of these data include instructions of any application or method configured to operate on the electronic equipment 800, contact data, phonebook data, messages, images, videos, and/or the like. The memory 804 may be realized by any type of volatile or non-volatile storage equipment or combination of the any type of volatile or non-volatile storage equipment, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 806 supplies electric power to various components of the electronic equipment 800. The power component 806 may include a power management system, one or more power supplies, and other components related to generating, managing and distributing electric power for the electronic equipment 800.

The multimedia component 808 includes a screen providing an output interface between the electronic equipment 800 and a user. The screen may include a Liquid Crystal Display (LCD) and a Touch Panel (TP). If the screen includes a TP, the screen may be realized as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some examples, the multimedia component 808 includes a front camera and/or a rear camera. When the electronic equipment 800 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 810 is configured to output and/or input an audio signal. For example, the audio component 810 includes a microphone (MIC). When the electronic equipment 800 is in an operation mode such as a call mode, a recording mode, and a voice recognition mode, the MIC is configured to receive an external audio signal. The received audio signal may be further stored in the memory 804 or may be sent via the communication component 816. In some examples, the audio component 810 further includes a loudspeaker configured to output the audio signal.

The I/O interface 812 provides an interface between the processing component 802 and a peripheral interface module. The peripheral interface module may be a keypad, a click wheel, a button, etc. These buttons may include but are not limited to: a homepage button, a volume button, a start button, and a lock button.

The sensor component 814 includes one or more sensors for assessing various states of the electronic equipment 800. For example, the sensor component 814 may detect an on/off state of the electronic equipment 800 and relative location of components such as the display and the keypad of the electronic equipment 800. The sensor component 814 may further detect a change in the location of the electronic equipment 800 or of a component of the electronic equipment 800, whether there is contact between the electronic equipment 800 and a user, the orientation or acceleration/deceleration of the electronic equipment 800, and a change in the temperature of the electronic equipment 800. The sensor component 814 may include a proximity sensor configured to detect existence of a nearby object without physical contact. The sensor component 814 may further include an optical sensor such as a Complementary Metal-Oxide-Semiconductor (CMOS) or Charge-Coupled-Device (CCD) image sensor used in an imaging application. In some examples, the sensor component 814 may further include an acceleration sensor, a gyroscope sensor, a magnetic sensor, a pressure sensor, or a temperature sensor.

The communication component 816 is configured to facilitate wired or wireless/radio communication between the electronic equipment 800 and other equipment. The electronic equipment 800 may access a radio network based on a communication standard such as WiFi, 2G, 3G, . . . , or a combination of the any communication standard. In an example, the communication component 816 broadcasts related information or receives a broadcast signal from an external broadcast management system via a broadcast channel. In an example, the communication component 816 further includes a Near Field Communication (NFC) module for short-range communication. For example, the NFC module may be realized based on Radio Frequency Identification (RFID), Infrared Data Association (IrDA), Ultra-WideBand (UWB) technology, BlueTooth (BT) technology, and other technologies.

In an example, the electronic equipment 800 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method.

In an example, a non-transitory computer-readable storage medium including instructions, such as the memory 804 including instructions, is further provided. The instructions may be executed by the processor 820 of the electronic equipment 800 to implement an aforementioned method. For example, the non-transitory computer-readable storage medium may be a Read-Only Memory (ROM), a Random Access Memory (RAM), a Compact Disc Read-Only Memory (CD-ROM), a magnetic tape, a floppy disk, optical data storage equipment, etc.

According to a first aspect of examples of the present disclosure, there is provided a method for processing ultrasonic waves, applied to coding equipment. The method includes:

determining a frequency combination corresponding to target data to be transmitted, the frequency combination comprising at least two different frequencies; and sending ultrasonic waves of frequencies in the frequency combination within a predetermined duration.

According to a second aspect of examples of the present disclosure, there is provided a method for processing ultrasonic waves, applied to decoding equipment. The method includes:

receiving ultrasonic waves;

determining, in the ultrasonic waves, at least one frequency combination including frequencies, each of the at least one frequency combination including at least two different frequencies; and determining target data based on the at least one frequency combination.

According to a third aspect of examples of the present disclosure, there is provided a device for processing ultrasonic waves, applied to coding equipment, the device including:

a first determining module configured to determine a frequency combination corresponding to target data to be transmitted, the frequency combination including at least two different frequencies; and a first sending module configured to send ultrasonic waves of frequencies in the frequency combination within a predetermined duration.

According to a fourth aspect of examples of the present disclosure, there is provided a device for processing ultrasonic waves, applied to decoding equipment, the device including:

a second receiving module configured to receive ultrasonic waves;

a second processing module configured to determine, in the ultrasonic waves, at least one frequency combination including frequencies, each of the at least one frequency combination including at least two different frequencies; and a second determining module configured to determine target data based on the at least one frequency combination.

According to a fifth aspect of examples of the present disclosure, there is provided coding equipment including a processor and a memory.

The memory is configured to store processor-executable instructions.

The processor is configured to implement the method for processing ultrasonic wave applied to the coding equipment according to any example of the present disclosure when executing the executable instructions.

According to a sixth aspect of examples of the present disclosure, there is provided decoding equipment including a processor and a memory.

The memory is configured to store processor-executable instructions.

The processor is configured to implement the method for processing ultrasonic wave applied to the decoding equipment according to any example of the present disclosure when executing the executable instructions.

According to a seventh aspect of examples of the present disclosure, there is provided a non-transitory computer-readable storage medium or recording medium, having stored therein an executable program which, when executed by a processor, implements the method for processing ultrasonic wave according to any example of the present disclosure.

Further note that although in drawings herein operations are described in a specific or der, it should not be construed as that the operations have to be performed in the specific or der or sequence, or that any operation shown has to be performed in or der to acquire an expected result. Under a specific circumstance, multitask and parallel processing may be advantageous.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the examples are intended to be illustrative.

It should be understood that the present disclosure is not limited to the exact construction that has been described above and illustrated in the accompanying drawings, and that various modifications and changes may be made to the present disclosure without departing from the scope of the present disclosure.

What is claimed is:

1. A method for processing ultrasonic waves, applied to coding equipment, comprising:
determining a frequency combination corresponding to target data to be transmitted, the frequency combination comprising at least two different frequencies; and
sending ultrasonic waves of frequencies in the frequency combination within a predetermined duration,
wherein sending the ultrasonic waves of the frequencies in the frequency combination within the predetermined duration comprises:
in response to determining that a number of pieces of target data is greater than or equal to two, acquiring two successive frequency combinations corresponding to two successive pieces of the target data; and
sending ultrasonic waves of the two successive frequency combinations through frequency modulation based on frequencies of a same ordinal logic in the two successive frequency combinations,
wherein the frequencies of the same ordinal logic include a first frequency in one of the two successive frequency combinations, and a second frequency in another of the two successive frequency combinations, and wherein the first frequency and the second frequency have a same order as appeared in their respective frequency combinations,
wherein sending the ultrasonic waves of the two successive frequency combinations through the frequency modulation based on the frequencies of the same ordinal logic in the two successive frequency combinations comprises at least one of:
in response to the frequencies of the same ordinal logic in the two successive frequency combinations being identical, performing splicing processing on the frequencies of the same ordinal logic in the two successive frequency combinations, and sending the ultrasonic waves of frequencies of the two successive frequency combinations subject to splicing processing;
or
in response to the frequencies of the same ordinal logic in the two successive frequency combinations being different, acquiring a shift frequency by performing frequency shift on the frequencies of the same ordinal logic in the two successive frequency combinations, splicing the shift frequency in between the frequencies of the same ordinal logic in the two successive frequency combinations, acquiring the two successive frequency combinations subject to splicing processing, and sending the ultrasonic waves of frequencies of the two successive frequency combinations subject to splicing processing.

2. The method of claim 1, comprising:
selecting M frequencies;
selecting any N frequencies of the M frequencies as a combination of frequencies, both the M and the N being integers greater than 1, the M being greater than the N; and
establishing a correspondence between data to be transmitted and the combination of frequencies, and
wherein determining the frequency combination corresponding to the target data to be transmitted comprises:
determining the frequency combination corresponding to the target data according to the correspondence.

3. The method of claim 1, further comprising:
adding a wake-up frequency to the ultrasonic waves, the wake-up frequency being configured to wake up decoding equipment, and
wherein sending the ultrasonic waves of the frequencies in the frequency combination within the predetermined duration comprises:
sending, within the predetermined duration, the ultrasonic waves of the frequencies in the frequency combination carrying the wake-up frequency.

4. The method claim 3, wherein the wake-up frequency is less than each frequency in the frequency combination.

5. The method of claim 1, wherein sending the ultrasonic waves of the frequencies in the frequency combination within the predetermined duration further comprises:
in response to determining that the number of pieces of target data is greater than or equal to two, after ultrasonic waves corresponding to an n-th piece of the target data have been transmitted, switching, through frequency modulation, to sending ultrasonic waves of frequencies in a frequency combination corresponding to an (n+1)-th piece of the target data within an (n+1)-th preset duration, the n being an integer greater than 0.

6. The method of claim 1, wherein sending the ultrasonic waves of the frequencies in the frequency combination within the predetermined duration further comprises:
in response to determining that the number of pieces of target data is greater than or equal to two, and receiving an instruction of successful decoding of the ultrasonic waves corresponding to the n-th piece of the target data after transmitting ultrasonic waves corresponding to an n-th piece of the target data, sending, within an (n+1)-th preset duration, ultrasonic waves of frequencies in a frequency combination corresponding to an (n+1)-th piece of the target data, the n being an integer greater than 0.

7. The method of claim 1, wherein the target data are configured to implement at least one of:
starting an application of decoding equipment;
triggering display of an interface of the application by the decoding equipment;
triggering a payment operation by the decoding equipment based on the application;
triggering return of information by the decoding equipment; or
triggering establishment of a connection with the coding equipment by the decoding equipment.

8. A method for processing ultrasonic waves, applied to decoding equipment, comprising:
receiving ultrasonic waves;
determining, in the ultrasonic waves, at least one frequency combination comprising frequencies, each of the at least one frequency combination comprising at least two different frequencies; and
determining target data based on the at least one frequency combination,
wherein in response to determining that a number of pieces of target data is greater than or equal to two, ultrasonic waves of two successive frequency combinations corresponding to two successive pieces of the target data are sent through frequency modulation based on frequencies of a same ordinal logic in the two successive frequency combinations,
wherein the frequencies of the same ordinal logic include a first frequency in one of the two successive frequency combinations, and a second frequency in another of the two successive frequency combinations, and wherein the first frequency and the second frequency have a same order as appeared in their respective frequency combinations, wherein the ultrasonic waves of the two successive frequency combinations corresponding to the two successive pieces of the target data are sent through the frequency modulation based on the frequencies of the same ordinal logic in the two successive frequency combinations comprises at least one of:

in response to the frequencies of the same ordinal logic in the two successive frequency combinations being identical, splicing processing is performed on the frequencies of the same ordinal logic in the two successive frequency combinations, and the ultrasonic waves of frequencies of the two successive frequency combinations subject to splicing processing are sent;

or in response to the frequencies of the same ordinal logic in the two successive frequency combinations being different, a shift frequency is acquired by performing frequency shift on the frequencies of the same ordinal logic in the two successive frequency combinations, the shift frequency is spliced in between the frequencies of the same ordinal logic in the two successive frequency combinations, the two successive frequency combinations subject to splicing processing is acquired, and the ultrasonic waves of frequencies of the two successive frequency combinations subject to splicing processing are sent.

9. The method of claim 8, wherein determining, in the ultrasonic waves, the at least one frequency combination comprising the frequencies comprises:

in response to the ultrasonic waves carrying a wake-up frequency, determining, based on the wake-up frequency, the at least one frequency combination comprising the frequencies in the ultrasonic waves.

10. The method of claim 8, comprising:

acquiring, based on the ultrasonic waves, frequency energy of the frequencies at an i-th time point and an (i-1)-th time point, and wherein determining, in the ultrasonic waves, the at least one frequency combination comprising the frequencies comprises:

in response to the frequency energy of the frequencies at the i-th time point and the (i-1)-th time point meeting an onset marker condition, determining the frequencies at the i-th time point as frequencies in a first frequency combination, the i being an integer greater than 1.

11. The method of claim 10, wherein the frequency energy of the frequencies at the i-th time point and the (i-1)-th time point meeting the onset marker condition comprises:

frequency energy of each frequency at the i-th time point being greater than an energy threshold corresponding to the each frequency at the i-th time point; and frequency energy of each frequency at the (i-1)-th time point being less than an energy threshold corresponding to the each frequency at the (i-1)-th time point.

12. The method of claim 8, wherein determining, in the ultrasonic waves, the at least one frequency combination comprising the frequencies comprises:

acquiring frequency energy of each frequency based on the ultrasonic waves; and in response to a number of frequencies, of which frequency energy of each frequency acquired based on the ultrasonic waves is greater than an energy threshold corresponding to the each frequency, exceeding a preset number, determining that the frequencies acquired from the ultrasonic waves are the frequencies of the at least one frequency combination.

13. The method of claim 8, further comprising at least one of:

determining, based on the target data, to start an application;

triggering, based on the target data, display of an interface of the application;

triggering, based on the target data, a payment operation based on the application;

sending, based on the target data, information; or establishing, based on the target data, a connection with coding equipment.

14. Coding equipment, comprising:

a processor; and a memory configured to store processor executable instructions, wherein the processor is configured to implement:

determining a frequency combination corresponding to target data to be transmitted, the frequency combination comprising at least two different frequencies; and sending ultrasonic waves of frequencies in the frequency combination within a predetermined duration, wherein sending the ultrasonic waves of the frequencies in the frequency combination within the predetermined duration comprises:

in response to determining that a number of pieces of target data is greater than or equal to two, acquiring two successive frequency combinations corresponding to two successive pieces of the target data; and sending ultrasonic waves of the two successive frequency combinations through frequency modulation based on frequencies of a same ordinal logic in the two successive frequency combinations, wherein the frequencies of the same ordinal logic include a first frequency in one of the two successive frequency combinations, and a second frequency in another of the two successive frequency combinations, and wherein the first frequency and the second frequency have a same order as appeared in their respective frequency combinations, wherein sending the ultrasonic waves of the two successive frequency combinations through the frequency modulation based on the frequencies of the same ordinal logic in the two successive frequency combinations comprises at least one of:

in response to the frequencies of the same ordinal logic in the two successive frequency combinations being identical, performing splicing processing on the frequencies of the same ordinal logic in the two successive frequency combinations, and sending the ultrasonic waves of frequencies of the two successive frequency combinations subject to splicing processing;

or in response to the frequencies of the same ordinal logic in the two successive frequency combinations being different, acquiring a shift frequency by performing frequency shift on the frequencies of the same ordinal logic in the two successive frequency combinations, splicing the shift frequency in between the frequencies of the same ordinal logic in the two successive frequency combinations, acquiring the two successive frequency combinations subject to splicing processing, and sending the ultrasonic waves of frequencies of the two successive frequency combinations subject to splicing processing.

15. The coding equipment of claim 14, wherein the processor is further configured to implement:
- selecting M frequencies;
- selecting any N frequencies of the M frequencies as a combination of frequencies, both the M and the N being integers greater than 1, the M being greater than the N; and
- establishing a correspondence between data to be transmitted and the combination of frequencies, and
- wherein determining the frequency combination corresponding to the target data to be transmitted comprises:
- determining the frequency combination corresponding to the target data according to the correspondence.

16. The coding equipment of claim 14, wherein the processor is further configured to implement:
- adding a wake-up frequency to the ultrasonic waves, the wake-up frequency being configured to wake up decoding equipment, and
- wherein sending the ultrasonic waves of the frequencies in the frequency combination within the predetermined duration comprises:
- sending, within the predetermined duration, the ultrasonic waves of the frequencies in the frequency combination carrying the wake-up frequency.

17. The coding equipment of claim 14, wherein the processor configured to implement sending the ultrasonic waves of the frequencies in the frequency combination within the predetermined duration is further configured to implement:
- in response to determining that a number of pieces of target data is greater than or equal to two, after ultrasonic waves corresponding to an n-th piece of the target data have been transmitted, switching, through frequency modulation, to sending ultrasonic waves of frequencies in a frequency combination corresponding to an (n+1)-th piece of the target data within an (n+1)-th preset duration, the n being an integer greater than 0.

18. The coding equipment of claim 14, wherein the target data are configured to implement at least one of:
- starting an application of decoding equipment;
- triggering display of an interface of the application by the decoding equipment;
- triggering a payment operation by the decoding equipment based on the application;
- triggering return of information by the decoding equipment; or
- triggering establishment of a connection with the coding equipment by the decoding equipment.

* * * * *